US010525905B2

(12) United States Patent
Iwata et al.

(10) Patent No.: US 10,525,905 B2
(45) Date of Patent: Jan. 7, 2020

(54) SILENCER FOR AUTOMOBILE AND MANUFACTURING METHOD THEREOF

(71) Applicant: HAYASHI TELEMPU CORPORATION, Nagoya-shi, Aichi (JP)

(72) Inventors: Shuzo Iwata, Aichi (JP); Arata Tajima, Aichi (JP); Takahiko Taniguchi, Aichi (JP); Junpei Shimomura, Aichi (JP); Kazuya Kusama, Aichi (JP)

(73) Assignee: HAYASHI TELEMPU CORPORATION, Nagoya-shi, Aichi (JP)

( * ) Notice: Subject to any disclaimer, the term of this patent is extended or adjusted under 35 U.S.C. 154(b) by 268 days.

(21) Appl. No.: 15/683,781

(22) Filed: Aug. 23, 2017

(65) Prior Publication Data
US 2017/0369005 A1     Dec. 28, 2017

Related U.S. Application Data

(63) Continuation of application No. PCT/JP2016/054995, filed on Feb. 22, 2016.

(30) Foreign Application Priority Data

Feb. 25, 2015   (JP) ................... 2015-034656

(51) Int. Cl.
*B60R 13/08*      (2006.01)
*B32B 5/26*       (2006.01)
(Continued)

(52) U.S. Cl.
CPC .......... *B60R 13/083* (2013.01); *B29C 43/203* (2013.01); *B29C 43/34* (2013.01);
(Continued)

(58) Field of Classification Search
CPC ... B60R 13/083; B60R 13/08; B60Y 2306/09; B60N 3/048; B29C 43/203; B29C 43/34;
(Continued)

(56) References Cited

U.S. PATENT DOCUMENTS 7,571,790 B2 *   8/2009   Kim ..................... E04B 1/8404
                                                         181/210
2009/0085378 A1 *  4/2009  Borchardt ........... B60R 13/0815
                                                         296/191

(Continued)

FOREIGN PATENT DOCUMENTS

EP         2195479 B       8/2011
JP       S56-140175 A     11/1981
(Continued)

OTHER PUBLICATIONS

International Search Report for PCT/JP2016/054995 dated Apr. 19, 2016.
PCT written opinion dated Apr. 19, 2016.

*Primary Examiner* — Forrest M Phillips
(74) *Attorney, Agent, or Firm* — Yokoi & Co., U.S.A.; Toshiyuki Yokoi

(57) ABSTRACT

The present invention discloses a silencer for automobile. The silencer is formed by press molding. The silencer has a first molded surface and a second molded surface which are opposite to each other in a thickness direction. The silencer at least includes a first fiber layer on which the first molded surface is formed and a second fiber layer integrated with an opposite surface to the first molded surface, the opposite surface being on the first fiber layer. Fibers of the second fiber layer exist partly on the opposite surface on the first fiber layer.

4 Claims, 15 Drawing Sheets

(51) Int. Cl.
    *D04H 1/559*    (2012.01)
    *B29C 43/36*    (2006.01)
    *D04H 1/732*    (2012.01)
    *B60N 3/04*    (2006.01)
    *B29C 43/34*    (2006.01)
    *B29C 70/50*    (2006.01)
    *B29C 70/78*    (2006.01)
    *B29C 70/46*    (2006.01)
    *B29C 43/20*    (2006.01)
    *B29C 43/18*    (2006.01)
    *B29C 43/52*    (2006.01)
    *B29C 43/40*    (2006.01)
    *B29L 31/30*    (2006.01)

(52) U.S. Cl.
    CPC .......... *B29C 43/3697* (2013.01); *B29C 70/46* (2013.01); *B29C 70/502* (2013.01); *B29C 70/78* (2013.01); *B32B 5/26* (2013.01); *B60N 3/048* (2013.01); *B60R 13/08* (2013.01); *D04H 1/559* (2013.01); *D04H 1/732* (2013.01); *B29C 43/18* (2013.01); *B29C 43/40* (2013.01); *B29C 43/52* (2013.01); *B29C 2043/3483* (2013.01); *B29K 2995/0002* (2013.01); *B29L 2031/3017* (2013.01); *B32B 2307/102* (2013.01); *B32B 2605/003* (2013.01); *B60Y 2306/09* (2013.01)

(58) Field of Classification Search
    CPC ..... B29C 43/3697; B29C 43/18; B29C 43/40; B29C 43/52; B29C 70/502; B29C 70/78; B32B 5/26; D04H 1/559; D04H 1/732; B29K 2995/0002; B29L 2031/3017

USPC ........................................................ 181/290
See application file for complete search history.

(56) References Cited

U.S. PATENT DOCUMENTS

| | | | |
|---|---|---|---|
| 2010/0101891 A1* | 4/2010 | Kamikawa | B32B 15/14 181/290 |
| 2015/0096831 A1* | 4/2015 | Kuras | E04B 1/84 181/290 |
| 2015/0232044 A1* | 8/2015 | Demo | B60R 13/08 181/290 |
| 2015/0258747 A1* | 9/2015 | Miyai | B32B 17/10568 428/172 |
| 2016/0012811 A1* | 1/2016 | Yamagiwa | B60N 3/048 181/290 |

FOREIGN PATENT DOCUMENTS

| JP | S60-84446 U1 | | 6/1985 |
|---|---|---|---|
| JP | H07-117584 A | | 5/1995 |
| JP | 2002-079868 A | | 3/2002 |
| JP | 2002-283903 A | | 10/2002 |
| JP | 2003-305790 A | | 10/2003 |
| JP | 2007-038854 A | | 2/2007 |
| JP | 2007216863 A | * | 8/2007 |
| JP | 2009-012561 A | | 1/2009 |
| JP | 2010-540790 A | | 12/2010 |
| JP | 2011-502065 A | | 1/2011 |

* cited by examiner

Fig. 9

| | 450 | 455 | | | | | | | | |
|---|---|---|---|---|---|---|---|---|---|---|
| #1 | 0 | 0 | 0 | 0 | 0 | 0 | 0 | 0 | 0 | 0 |
| #2 | 0 | 1 | 2 | 3 | 4 | 4 | 3 | 2 | 1 | 0 |
| #3 | 0 | 1 | 2 | 2 | 2 | 2 | 2 | 2 | 1 | 0 |
| #4 | 0 | 1 | 2 | 3 | 4 | 4 | 3 | 2 | 1 | 0 |
| #5 | 0 | 0 | 0 | 0 | 0 | 0 | 0 | 0 | 0 | 0 |
| #6 | 0 | 0 | 0 | 0 | 0 | 0 | 0 | 0 | 0 | 0 |
| #7 | 0 | 1 | 2 | 3 | 4 | 4 | 3 | 2 | 1 | 0 |
| #8 | 0 | 1 | 2 | 2 | 2 | 2 | 2 | 2 | 1 | 0 |
| #9 | 0 | 1 | 2 | 3 | 4 | 4 | 3 | 2 | 1 | 0 |
| #10 | 0 | 0 | 0 | 0 | 0 | 0 | 0 | 0 | 0 | 0 |

→ t

Press molding process P1

Press molding process P2

Press molding process P3

SILENCER FOR AUTOMOBILE AND MANUFACTURING METHOD THEREOF

CROSS-REFERENCES TO RELATED APPLICATIONS

This Application claims the benefit of priority and is a Continuation application of the prior International Patent Application No. PCT/JP2016/054995, with an international filing date of Feb. 22, 2016, which designated the United States, and is related to the Japanese Patent Application No. 2015-034656, filed Feb. 25, 2015, the entire disclosures of all applications are expressly incorporated by reference in their entirety herein.

BACKGROUND OF THE INVENTION

1. Field of the Invention

The present invention relates to a press molded silencer for automobile and manufacturing method thereof.

2. Description of Related Art

For example, a floor silencer interposed between a floor panel and a floor carpet is known as the silencer installed on the automobile. The floor silencer has a function of noise insulation, a function of preventing unevenness of the floor panel from appearing on the surface of the carpet, and a function of giving comfortable feeling to a passenger who steps on the floor carpet. A fibrous silencer is used as the silencer for realizing these functions.

Japanese Translation of PCT Application No. 2010-540790 discloses a fiber supply device for manufacturing web for automobile, the web having holes penetrating in a thickness direction. The fiber supply device includes a fiber distribution device which is divided into a plurality of small sections and a perforated moving belt which is installed under the fiber distribution device. The fibers coming out of each section of the fiber distribution device are directly placed on the perforated moving belt or diverted from the perforated moving belt. The area where the fibers are directly placed on the perforated moving belt is located around the area where the fibers are diverted from the perforated moving belt. A fiber aggregate formed as described above is pressed to form a web having through holes and used for automobile.

BRIEF SUMMARY OF THE INVENTION

When the fiber aggregate formed by selectively placing the fibers coming out of each section of the fiber distribution device on the perforated moving belt is press-molded, the shape of the fiber molded body is easily collapsed or cracked.

The above described problem also occurs in various silencers (e.g., dash silencer) for automobile without limited to the floor silencer.

The present invention discloses a silencer for automobile, the silencer being capable of preventing the shape of the fiber molded body having partly different weight per unit area from being collapsed, being cracked, and so on.

One aspect of the present invention provides a silencer for automobile, the silencer being formed by press molding, the silencer having a first molded surface and a second molded surface which are opposite to each other in a thickness direction, the silencer comprising: a first fiber layer on which the first molded surface is formed; and a second fiber layer integrated with an opposite surface to the first molded surface, the opposite surface being on the first fiber layer, wherein fibers of the second fiber layer exist partly on the opposite surface on the first fiber layer.

Another aspect of the present invention provides a method of manufacturing a silencer for automobile, the method comprising: a first fiber supply step of supplying fibers on a conveyer from a first fiber supply unit to form a first supply fiber layer; a second fiber supply step of partly supplying fibers on the first supply fiber layer from a second fiber supply unit to form a second supply fiber layer; and a molding step of press-molding a fiber aggregate transferred by the conveyer, the fiber assembly at least including the first supply fiber layer and the second supply fiber layer.

BRIEF DESCRIPTION OF THE DRAWINGS

FIG. 9 is a drawing schematically showing an example of a controller of the silencer manufacturing apparatus.

DETAILED DESCRIPTION OF THE INVENTION

Figure 1:
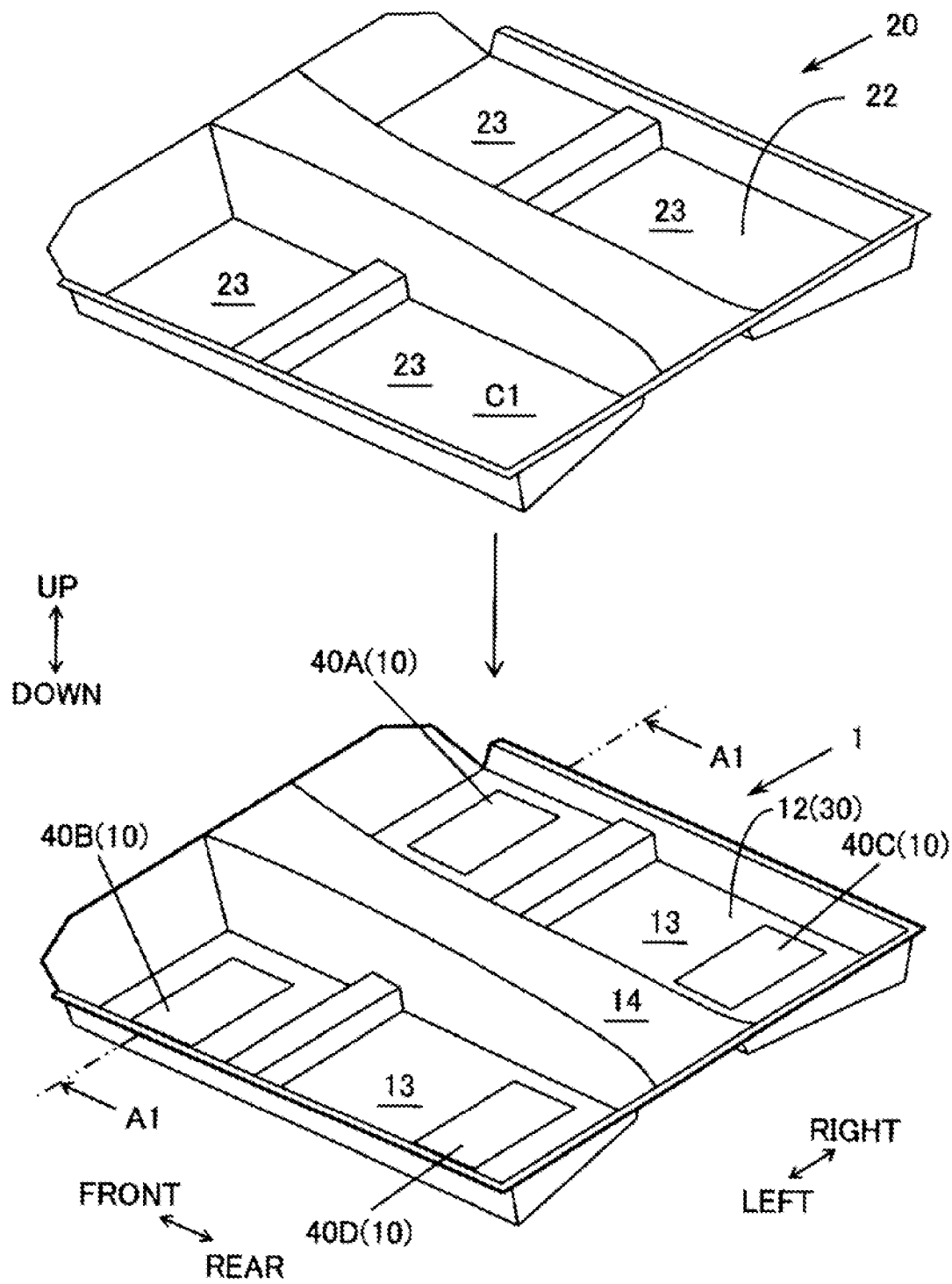
FIG. 1 is a perspective view schematically exemplifying an outer appearance of a silencer and a skin material of a vehicle compartment C1 side.

Hereafter, embodiments of the present invention will be explained. Of course, the below-described embodiments merely exemplify the present invention. All features disclosed in the embodiments are not necessarily essential for solving the present invention.

(1) Outline of Technology Included in the Present Invention

First, with reference to schematic examples shown in FIGS. 1 to 15, an outline of the technology included in the present invention will be explained.

Embodiment 1

A silencer 1 for automobile according to the present technology is formed by press molding. The silencer 1 has a first molded surface 11 and a second molded surface 12 which are opposite to each other in a thickness direction D3. The silencer 1 at least includes a first fiber layer 110 and a second fiber layer 120. The first molded surface 11 is formed on the first fiber layer 110. The second fiber layer 120 is integrated with an opposite surface to the first molded surface 11 on the first fiber layer 110, and fibers of the second layer 120 exist partly.

In the press-molded silencer 1 for automobile of the above described embodiment, the second fiber layer 120 is integrated with the first fiber layer 110 on which the first molded surface 11 is formed and the fibers of the second fiber layer 120 exist partly. Thus, the first fiber layer 110 functions as a base layer and shape-retaining property is imparted to the silencer 1. Accordingly, the present technology can provide a silencer for automobile, the silencer being capable of preventing the shape of the fiber molded body having partly different weight per unit area from being collapsed, being cracked, and so on. Because of this, for example, followability of the silencer with respect to the vehicle body panel can be improved and a clearance between the silencer and the vehicle body panel can be minimized. Consequently, vibration control performance can be increased and quietness in the vehicle compartment can be improved.

The silencer 1 for automobile of the present technology can be installed, for example, on a floor portion of the vehicle compartment, a side wall portion of the vehicle compartment, a ceiling portion of the vehicle compartment, a deck floor portion, a dashboard portion, an engine hood portion and a fender portion. The silencer can be installed on an interior part and an exterior part.

All the first molded surface 11 can be formed on the first fiber layer 110. Alternatively, the first molded surface 11 can be formed both on an insertion material such as a buffer material 40 and the first fiber layer 110.

Note that "the second fiber layer 120 on which the fibers exist partly" can be rephrased as "the fiber layer having partly different weight per unit area." The second fiber layer having partly different weight per unit area can include an area having no fiber (i.e., weight per unit area is 0).

In the silencer for automobile, a member such as a foamed molded body can be attached afterward to at least one of the first molded surface and the second molded surface, and such a configuration is also included in the silencer for automobile of the present technology.

Embodiment 2

The silencer 1 for automobile can have a third fiber layer 130 on which the second molded surface 12 is formed. In the press-molded silencer 1 for automobile of the above described embodiment, the fibers of the second fiber layer 120 exist partly and the second fiber layer 120 is arranged between the first fiber layer 110 and the third fiber layer 130. Thus, the shape-retaining property can be increased.

Embodiment 3

The silencer 1 for automobile can include a lamination portion 10 in which a buffer material 40 is inserted into a fiber assembly 30 so as to be partly laminated on the fiber assembly 30, the fiber assembly 30 at least including the first fiber layer 110 and the second fiber layer 120. A convex portion 45 can be formed on at least one of the first molded surface 11 and the second molded surface 12 so that the convex portion 15 is located at a position of an edge portion 10a of the lamination portion 10 in a direction different from the thickness direction D3. In the above described embodiment, since the convex portion 15 is formed at the position of the edge portion 10a of the lamination portion 10 in the buffer material 40, fibers 34 of the fiber assembly 30 are extruded to the convex portion 15 when press molding is performed. Thus, the roundly protruded shape of the convex portion 15 becomes sharp. Accordingly, the clearance between the vehicle body panel and the silencer can be reduced and vibration control performance can be increased.

Here, the fiber assembly 30 can include the third fiber layer 130. Alternatively, the fiber assembly 30 can include the fiber layers different from the fiber layers 110, 120, 130.

Embodiment 4

A method of manufacturing a silencer 1 for automobile of the present technology includes: a first fiber supply step S1 of supplying fibers F1 on a conveyer 440 from a first fiber supply unit 410 to form a first supply fiber layer 310; a second fiber supply step S2 of partly supplying fibers F2 on the first supply fiber layer 310 from a second fiber supply unit 420 to form a second supply fiber layer 320; and a molding step S5 of press-molding a fiber aggregate 300 transferred by the conveyer 440, the fiber aggregate 300 at least including the first supply fiber layer 310 and the second supply fiber layer 320.

In the above described embodiment, the first supply fiber layer 310 is formed by the fibers F1 supplied on the conveyer 440 from the first fiber supply unit 410, the second supply fiber layer 320 is formed by the fibers F2 partly supplied on the first supply fiber layer 310 from the second fiber supply unit 420, and the fiber aggregate 300 transferred by the conveyer 440 is press molded, the fiber aggregate 300 at least including the first supply fiber layer. Accordingly, the present technology does not require a process of preliminarily and separately producing a fiber mat. Thus, the silencer for automobile can be manufactured from fibers in a series of processes in a manufacturing line. In addition, since the fibers F2 of the second supply fiber layer 320 formed on the first supply fiber layer 310 exist partly, the first supply fiber layer 310 functions as a base layer and the shape-retaining property is imparted to the silencer 1. Accordingly, the present technology can provide a silencer for automobile, the silencer being capable of preventing the shape of the fiber molded body having partly different weight per unit area from being deformed, being cracked, and so on. Because of this, for example, followability of the silencer with respect to the vehicle body panel can be improved and a clearance between the silencer and the vehicle body panel can be minimized. Consequently, vibration control performance can be increased and quietness in the vehicle compartment can be improved.

Here, the fiber aggregate 300 can be pre-heated after the second supply fiber layer 320 is formed and before the fiber aggregate 300 is press molded.

In the second fiber supply step, the second supply fiber layer 320 can be formed by supplying the fibers F2 on the first supply fiber layer 310 from the second fiber supply unit 420 so that a weight per unit area of the fibers F2 is partly different. In the process of supplying the fibers to form the second supply fiber layer, the second supply fiber layer having partly different weight per unit area can include an area having no fiber (i.e., weight per unit area is 0).

Embodiment 5

The second fiber supply unit 420 can include a plurality of divided fiber supply units 425 which supply the fibers F2 to supply positions. Each of the supply positions is different in a width direction D5 of the conveyer 440. In the second fiber supply step S2, a weight per unit area of the fibers F2 supplied from the divided fiber supply units 425 to the first supply fiber layer 310 can be controlled variably and individually by the divided fiber supply unit 425. In the above described embodiment, the weight per unit area of the second supply fiber layer 320 formed on the first supply fiber layer 310 can be changed in the width direction D5 and the moving direction D4 of the conveyer 440. Thus, the fibers can be efficiently used for manufacturing the silencer for automobile.

Here, the variable control of the weight per unit area of the supplied fiber means the control of changing the weight per unit area of the supplied fiber.

Embodiment 6

The manufacturing method can include a third fiber supply step S3 of supplying fibers F3 from a third fiber supply unit 430 on the second supply fiber layer 320 and the first supply fiber layer 310 on which the fibers F2 of the second supply fiber layer 320 do not exist to form a third supply fiber layer 330. The fiber aggregate 300 can at least include the first supply fiber layer 310, the second supply fiber layer 320 and the third supply fiber layer 330. In the above described embodiment, the second supply fiber layer 320 formed by the partly supplied fibers F2 is arranged between the first supply fiber layer 310 and the third supply fiber layer 330. Thus, the shape-retaining property can be increased.

Here, the fiber aggregate 300 can be pre-heated after the third supply fiber layer 330 is formed and before the fiber aggregate 300 is press molded.

The fiber aggregate 300 can include the fiber layers different from the fiber layers 310, 320, 330.

Embodiment 7

When the buffer material 40 includes fibers 44, the fibers 44 can be oriented in a thickness direction D3. The buffer material 40 of the above described embodiment has high compressive strength in the thickness direction D3. Thus, the buffer material 40 is hardly deformed in the thickness direction D3 even when the press molding is performed. The buffer material 40 is partly laminated on the fiber assembly 30. Thus, the above described embodiment can provide a new silencer for automobile, the silencer partly having high compressive strength in the thickness direction.

If the fibers of the buffer material are oriented in the thickness direction, it means that an orientation direction of the fibers matches relatively well with a direction orthogonal to an outer surface of the front side and an outer surface of the back side of the buffer material. In addition, the folded-back portion for orienting the fibers in the thickness direction can be formed. Since the fibers constituting the buffer material can have a curved shape, the fibers of the buffer material being oriented in the thickness direction do not mean that straight fibers are arranged parallel to each other in the thickness direction of the buffer material.

From the above, the buffer material in which fibers are oriented in the thickness direction can be the buffer material of a wavelike shape in which webs are repeatedly folded back in the thickness direction, the buffer material obtained by dividing the buffer material having the wavelike shape into two parts at the middle in the thickness direction, the buffer material in which folded-back portions of the buffer material having the wavelike shape are cut out, and the buffer material in which webs are repeatedly laminated, for example.

The fibers constituting the buffer material can be a single kind of fiber or a combination of two or more kinds of fibers, such as a combination of a main fiber and an adhesive fiber. The fibers constituting the fiber assembly can also be a single kind of fiber or a combination of two or more kinds of fibers, such as a combination of a main fiber and an adhesive fiber.

Even if the thickness direction of the silencer does not completely matches with the thickness direction of the buffer material, such a configuration is also included in the present technology.

The lamination portion includes the portion where the buffer material and the fiber assembly are in contact with each other in the thickness direction, and also includes the portion where another layer such as a resin layer is formed between the buffer material and the fiber assembly.

Embodiment 8

In the lamination portion 10, the density of the buffer material 40 can be equal to or lower than the density of the fiber assembly 30. The above described embodiment can provide a light-weight silencer having comfortable feeling and used for automobile.

Embodiment 9

A concave portion 31 can be formed on an outer surface of the fiber assembly 30, and the buffer material 40 can be inserted into the concave portion 31. The above described embodiment can provide a silencer having more combatable feeling and used for automobile.

Embodiment 10

The fibers of the buffer material 40 may include a main fiber 45 and a binder (adhesive fiber 46). The buffer material 40 can be adhered to on a bottom portion 31b of the concave portion 31 of the fiber assembly 30 and a side portion 31a of the concave portion 31 of the fiber assembly 30. In the above described embodiment, since the binder (46) is included in the fibers of the buffer material 40, the shape of the press-molded buffer material 40 can be maintained. Furthermore, the buffer material 40 adheres to not only the bottom portion 31b of the concave portion 31 of the fiber assembly 30 but also the side portion 31a of the concave portion 31. Accordingly, in the silencer for automobile of the above described embodiment, the buffer material in which the fibers are oriented in the thickness direction can have good adhesiveness to the fiber assembly.

Embodiment 11

A main fiber 35 and a binder (adhesive fiber 36) can be included in fibers 34 of the fiber assembly 30. The bottom portion 31b of the concave portion 31 of the fiber assembly 30 and the side portion 31a of the concave portion 31 of the fiber assembly 30 can be adhered to on the buffer material 40. In the above described embodiment, since the binder (36) is included in the fibers 34 of the fiber assembly 30, the shape of the press-molded fiber assembly 30 can be maintained. Furthermore, the buffer material 40 adheres to not only the bottom portion 31b of the concave portion 31 of the fiber assembly 30 but also the side portion 31a of the concave portion 31. Accordingly, in the silencer 1 for automobile of the above described embodiment, the buffer material in which the fibers are oriented in the thickness direction can have good adhesiveness to the fiber assembly.

Embodiment 12

When the first molded surface 11 is located at the skin material (carpet 20) side and the second molded surface 12 is located at the vehicle body panel 80 side, the outer surface (40a) of the buffer material 40 can be included in the first molded surface 11. Since the buffer material 40 in which the fibers 44 are oriented in the thickness direction D3 is located at the skin material (20) side of the silencer 1, the feeling of the buffer material 40 can be obtained easily. Accordingly, the above described embodiment can provide the silencer having more combatable feeling and used for automobile.

The skin material includes a carpet, woven fabric, non-woven fabric, resin, elastomer and rubber, for example.

Embodiment 13

Figure 11:
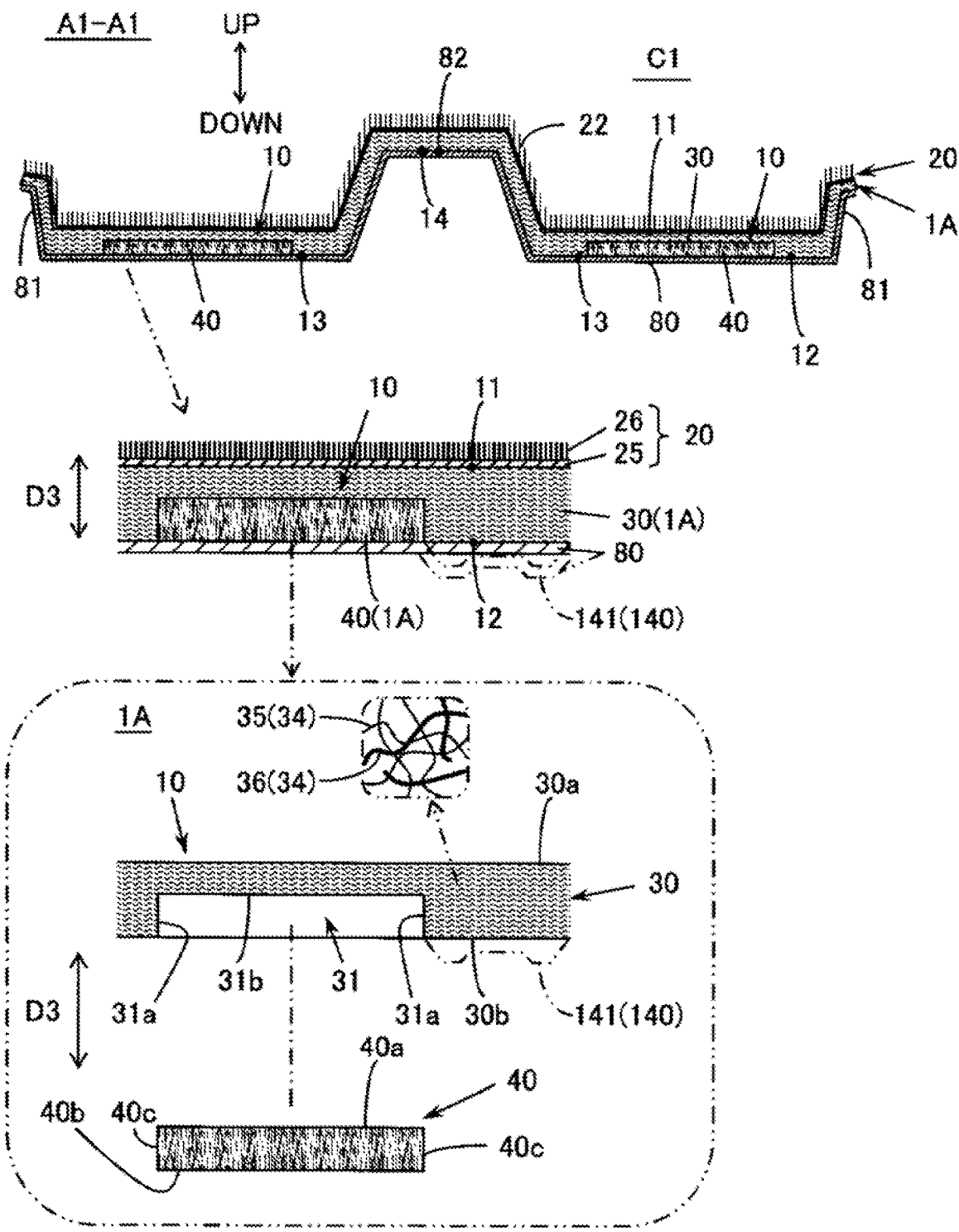
FIG. 11 is a drawing schematically exemplifying a vertical end surface of another silencer together with the vehicle body panel and the skin material cut at the position corresponding to A1-A1 in FIG. 1.

An outer surface (40b) of the buffer material 40 can be included in the second molded surface 12 (as shown in FIG. 11, for example). Since the buffer material 40 in which the fibers 44 are oriented in the thickness direction D3 is located at the vehicle body panel 80 side, the load applied from the skin material (20) side to the vehicle body panel 80 side is supported by the fibers 44 oriented in the thickness direction D3 of the buffer material 40 via the fiber assembly 30. Accordingly, the above described embodiment can provide the silencer having higher compressive strength in the thickness direction and used for automobile.

Embodiment 14

Figure 12A:
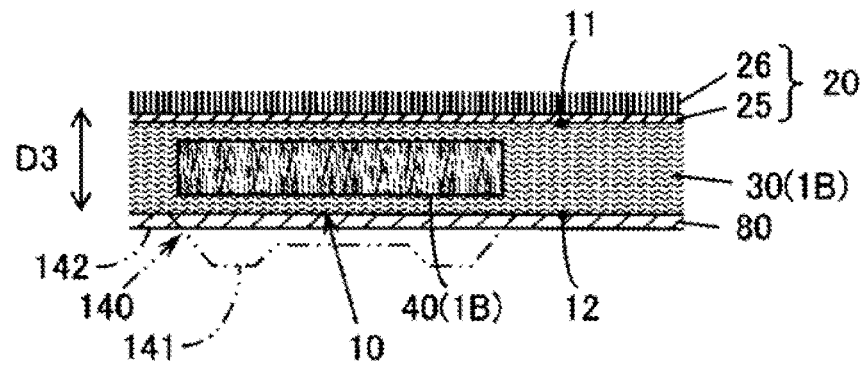
FIGS. 12A and 12B are drawings schematically exemplifying a vertical end surface of another silencer together with the vehicle body panel and the skin material cut at the position corresponding to A1-A1 in FIG. 1.
Figure 12B:
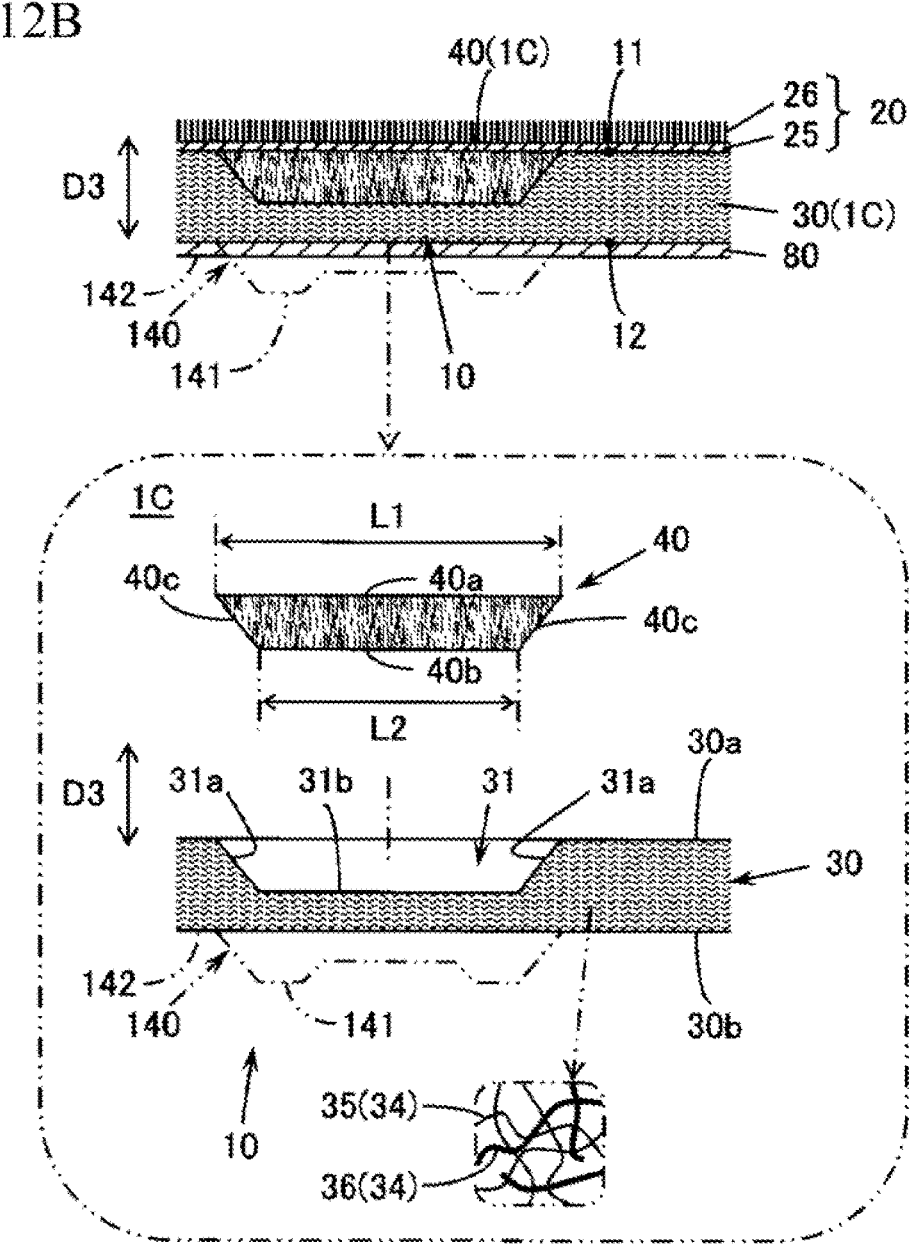

The buffer material 40 can be formed in an approximately trapezoidal cross section when cut along the thickness direction D3 so that a length L1 of a side at the first molded surface 11 side is different from a length L2 of a side at the second molded surface 12 side (as shown in FIG. 12B, for example). When the buffer material 40 is formed in an approximately trapezoidal cross section, adhesive strength between the buffer material 40 and the fiber assembly 30 becomes higher at a circumferential portion 40c compared to the buffer material 40 having a rectangular cross section. Accordingly, the above described embodiment can improve adhesiveness of the buffer material adhered to on the fiber assembly.

Embodiment 15

When the first molded surface 11 is located at the skin material (20) side and the second molded surface 12 is located at the floor panel (80) side, the lamination portion 10 can be located at the floor panel (80) side of the skin material (20) at a portion (footrest portion 23) where a foot of a passenger is placed. Since the buffer material 40 in which the fibers 44 are oriented in the thickness direction D3 is located at the floor panel (80) side of the skin material (20) at the portion (footrest portion 23) where the foot of the passenger is placed, the above described embodiment can provide the silencer for the floor of automobile having good performance when stepped on by the foot.

(2) Concrete Example of the Silencer

FIGS. 1 to 15 show examples of applying the silencer for automobile of the present technology to the silencer for the floor of the automobile. In the figures, FRONT, REAR, LEFT, RIGHT, UP and DOWN respectively represent the front, rear, left, right, up and down side of the automobile. Positional relation of the left and right is based on a direction of viewing the front from the rear of the automobile. A reference numeral D1 shown in FIG. 6A and other figures indicates a lamination direction of a web M1. A reference numeral D2 shown in FIG. 6A and other figures indicates a width direction of the web M1. A reference numeral D3 indicates a thickness direction of the buffer material 40. A reference numeral D11 shown in FIG. 6A and other figures indicates an extruding direction of the buffer material 40 extruded by the buffer material manufacturing apparatus. A reference numeral D12 shown in FIG. 6A and other figures indicates an opposite direction of the extruding direction D11. The directions D1, D2 and D3 are perpendicular to each other. However, the present invention also includes the case where the directions D1, D2 and D3 are not perpendicular to each other as long as the directions D1, D2 and D3 are different directions. To make the explanation easier, magnification ratios of the directions D1, D2 and D3 may be different, and each of the figures may not fit together. A reference numeral D4 shown in FIG. 3 and other figures indicates a moving direction of the conveyer 440 shown in FIG. 8. A reference numeral D5 shown in FIG. 3 and other figures indicates a width direction of the conveyer 440.

Normally, a floor carpet (skin material) 20 exemplified in FIG. 1 is laid on the floor panel (vehicle body panel 80) in the occupant compartment of the automobile to cover and shield the floor panel. Because of this, as the occupant compartment, designability of the interior is improved. In addition, comfortable feeling of stepping is given when a passenger steps on the floor carpet. As exemplified in FIG. 2, unevenness is formed on the floor panel.

A floor silencer serving as a bulking material is installed between the floor panel and the floor carpet to absorb the unevenness and keep flatness of the floor surface.

To satisfy the need of improving the quietness in the vehicle compartment, as exemplified in FIG. 1, the silencer 1 is integrally or separately formed to cover the entire reverse surface of the floor carpet. Thus, the entire floor panel is covered. A large silencer 1 shown in FIG. 1 is formed to have different thickness and weight per unit area according to the unevenness of the floor panel for each area. Thus, the silencer 1 is formed as an integrally molded article to cover the entire surface of the floor carpet. In addition, the function of the bulking material is imparted. Consequently, the silencer 1 exhibits the function of simultaneously absorbing and insulating the noise coming from outside the vehicle. Namely, the floor silencer laid on the vehicle body panel of the automobile is formed to have a shape along the unevenness of the vehicle body panel and laid on the vehicle body panel. Thus, the floor silencer is used for securing performance such as cushioning performance and soundproof performance of the floor of the automobile, for example. The silencer for automobile of the present technology can be installed, for example, on a side wall portion of the vehicle compartment, a ceiling portion of the vehicle compartment, a deck floor portion, a dashboard portion, an engine hood portion and a fender portion in addition to the floor portion in accordance with the shape of the installing portion.

Figure 2:
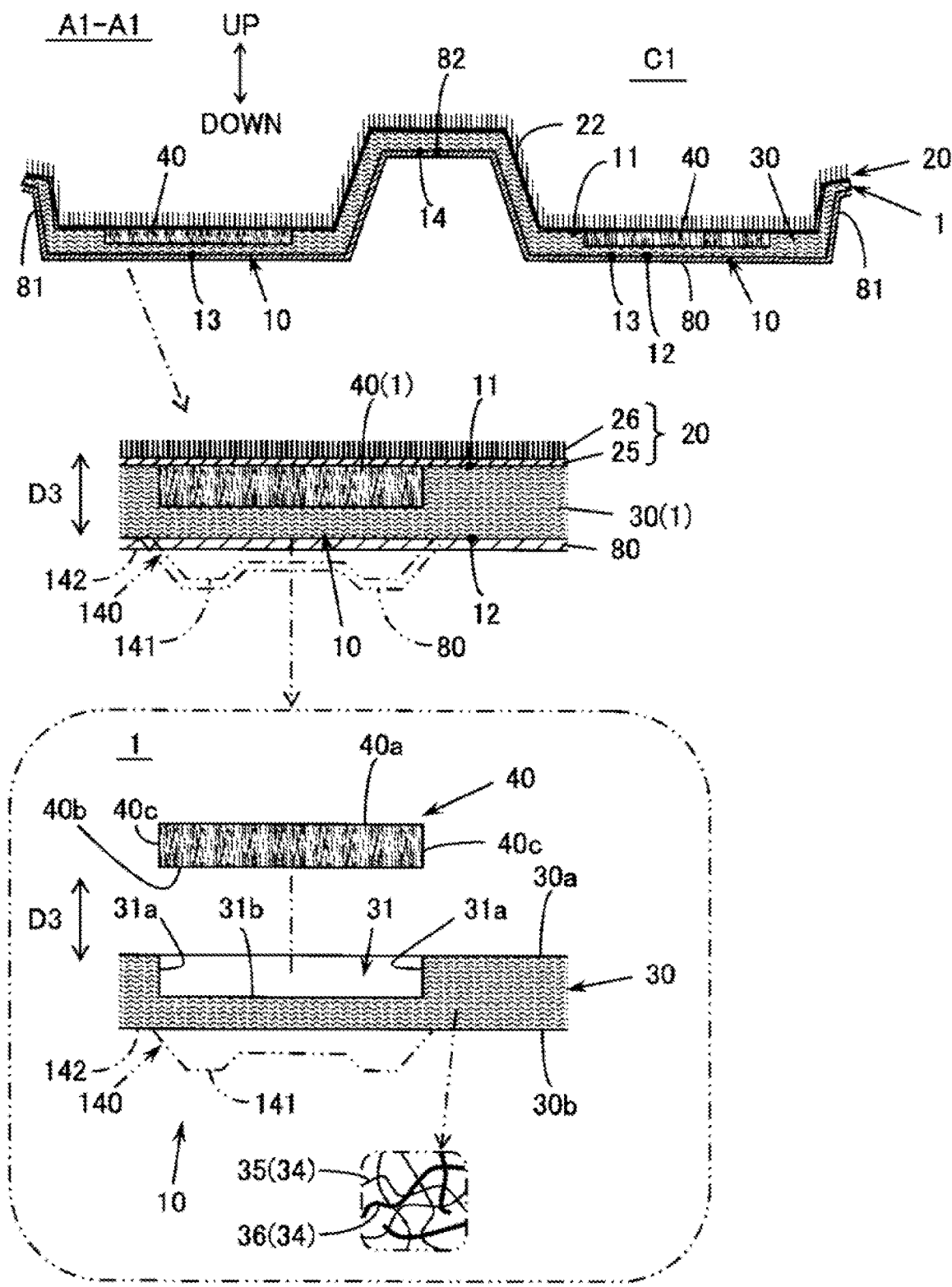
FIG. 2 is a drawing schematically exemplifying a vertical end surface of the silencer together with the vehicle body panel and the skin material cut at the position corresponding to A1-A1 in FIG. 1.

The silencer 1 for automobile shown in FIG. 1 is a functional material mounted on a floor panel (a kind of the vehicle body panel) having an approximately flat shape to form the floor surface of the vehicle, a toe board panel (a kind of the vehicle body panel) rising upward from the floor panel surface at the front part in the occupant compartment, and other vehicle body panels. A tunnel portion (raised portion) 82 is formed at the center in a vehicle width direction of the floor panel and the toe board panel so as to be projected upward and extended to the front and rear. As shown in FIG. 2, both edge portions 81, 81 of the vehicle body panel 80 in the vehicle width direction are projected outward in the vehicle width direction. The silencer 1 for the vehicle compartment is laid on the vehicle compartment C1 side of the vehicle body panel 80. The silencer 1 is formed into a three dimensional shape fitting to a vertical wall of the protrusion such as a console and a rocker panel. The silencer 1 shown in FIGS. 1 and 2 has a tunnel portion 14 projected upward and extended to the front and rear fitting to the tunnel portion 82 of the vehicle body panel, and approximately flat portions 13, 13 fitting to an approximately flat portion of the vehicle body panel 80 at the outer side of the tunnel portion 14 in the vehicle width direction. A floor carpet 20 is laid on the vehicle compartment C1 side of the silencer 1. The floor carpet 20 is formed into a three dimensional shape fitting to a vertical wall of the protrusion of the silencer 1 to decorate inside the occupant compartment.

A concavo-convex shape 22 of the vehicle compartment C1 side is formed on the floor carpet 20 shown in FIGS. 1 and 2 by press molding, and the floor carpet 20 is arranged to face the vehicle compartment C1. The carpet 20 is a tufted carpet having back stitches of piles 26 in a base layer 25, for example. A large number of piles 26 are raised on the vehicle compartment C1 side of the base layer 25. For the foundation cloth constituting the base layer 25, nonwoven fabrics such as a spunbond nonwoven fabric and knitted materials of various kinds of fibers can be used, for example. A backing can be provided on the reverse surface (surface of the silencer 1 side) of the foundation cloth. For the backing, resin materials (inclusive of elastomers) and fiber materials can be used, for example. Of course, for the carpet 20, a needle punched carpet, in which a nonwoven fabric is needled to intertwine fibers and fluff is formed on the surface, can be also used, for example.

Figure 6A:
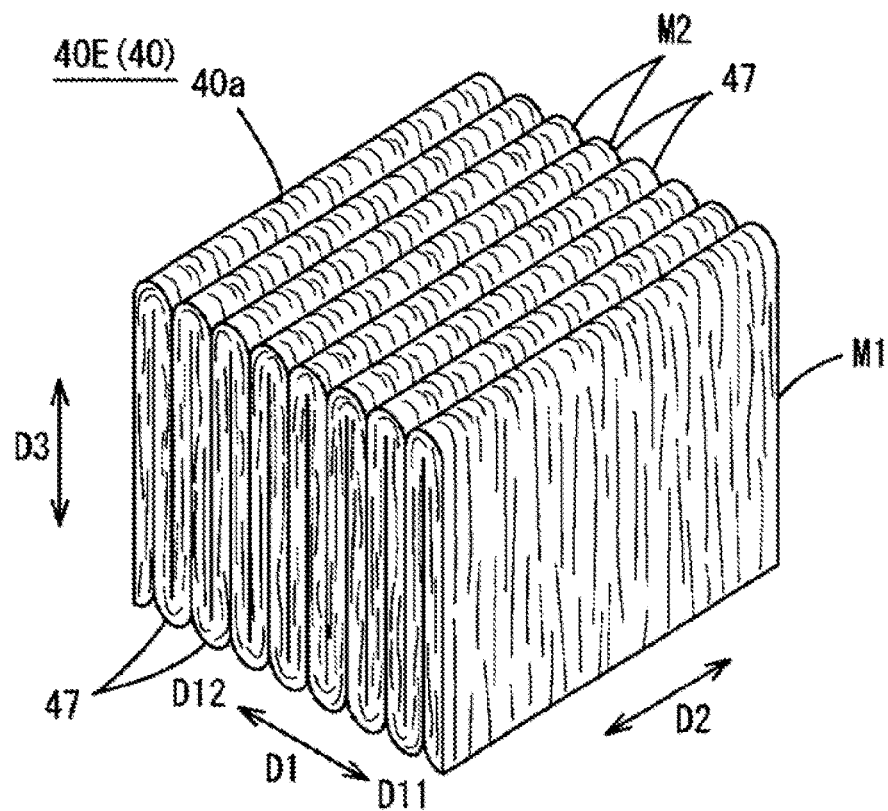
FIG. 6A is a perspective view schematically exemplifying a main portion of the buffer material 40E in which the folded-back portions 47 are kept remained.
Figure 6B:
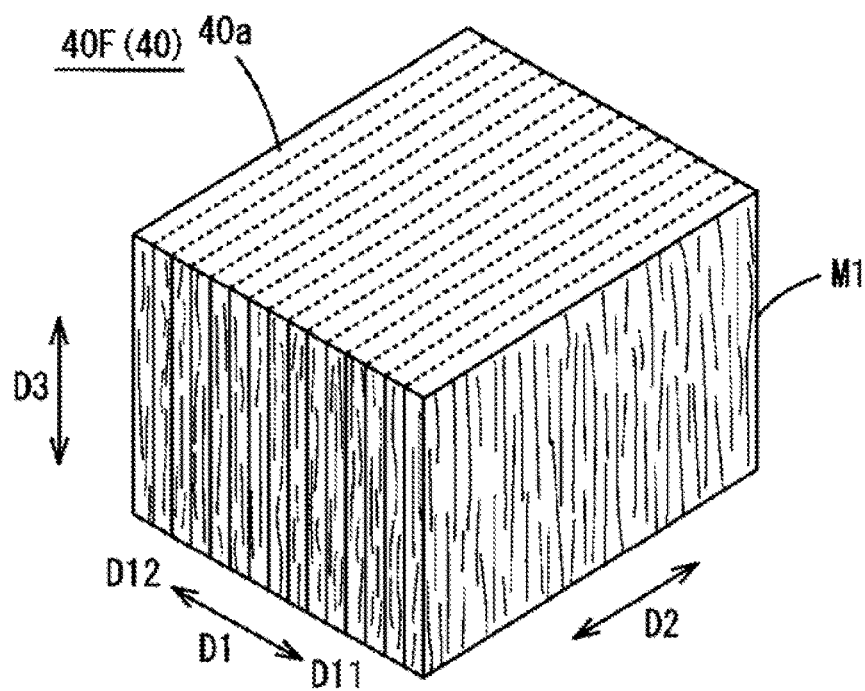
FIG. 6B is a perspective view schematically exemplifying a main portion of a buffer material 40F from which the folded-back portions 47 are cut off.

In the silencer 1, a concavo-convex shape is formed by press molding on the first and second molded surfaces 11, 12 which are opposite to each other in the thickness direction D3. The silencer 1 is installed between the vehicle body panel 80 and the floor carpet 20. Here, the first molded surface 11 is located at the carpet 20 side, and the second molded surface 12 is located at the floor panel (vehicle body panel 80) side. The silencer 1 can be formed by press molding the fiber assembly 30 in which the buffer material 40 is inserted. In this case, the silencer 1 includes the lamination portion 10 formed by partly laminating the buffer material 40 on the fiber assembly 30. In the silencer 1 shown in FIG. 1, the lamination portion 10 is located at the floor panel side of the footrest portion 23 of the carpet 20. The floor panel side is a portion where a foot of a passenger is placed. FIG. 1 shows that a buffer material 40A is inserted into the fiber assembly 30 located at the foot of the driver seat, a buffer material 40B is inserted into the fiber assembly 30 located at the foot of the front passenger seat, a buffer material 40C is inserted into the fiber assembly 30 located at the foot of the rear seat of the driver seat side, and a buffer material 40D is inserted into the fiber assembly 30 located at the foot of the rear seat of the front passenger seat side. The buffer materials 40A to 40D and the buffer materials 40E, 40F shown in FIGS. 6A and 6B are collectively called "buffer material 40." In addition, the silencer 1 can be a press molded article of the fiber assembly 30 in which the buffer material 40 is not inserted.

Figure 3:
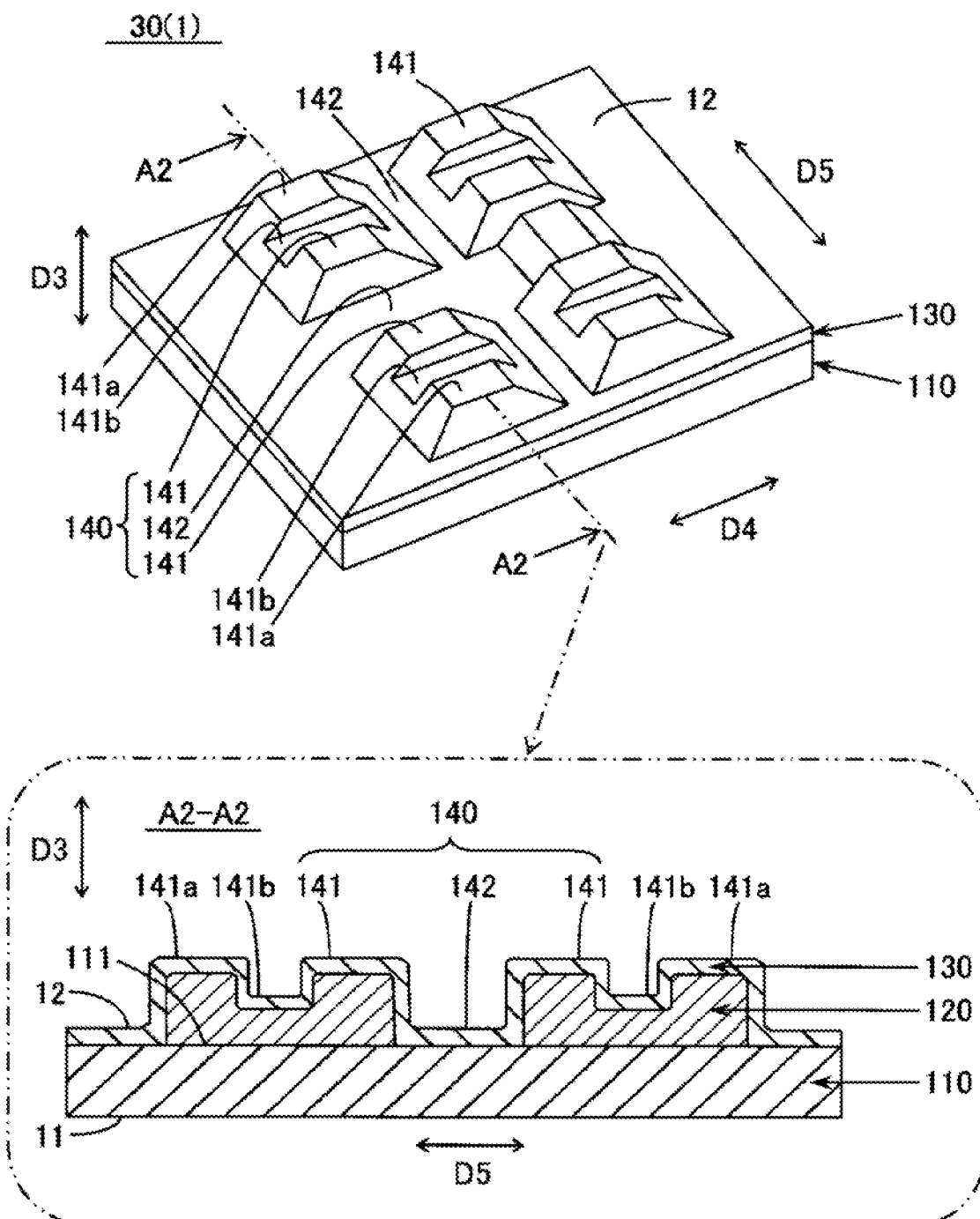
FIG. 3 is a drawing schematically showing an example of the silencer.

FIG. 3 schematically shows an example of the vehicle body panel 80 side of the silencer 1 formed by press molding. The lower part of FIG. 3 schematically shows an example of a vertical cross-section cutting the silencer 1 at the position corresponding to A2-A2. The fiber assembly 30 of the silencer 1 includes the first fiber layer 110, the second fiber layer 120 and the third fiber layer 130. The first molded surface 11 is formed on the first fiber layer 110 to serve as the floor panel side. The first fiber layer 110 has an approximately uniform weight per unit area. The second fiber layer 120 is integrated with an opposite surface 111 to the first molded surface 11 on the first fiber layer 110. The second fiber layer 120 has partly different weight per unit area. The second molded surface 12 is formed on the third fiber layer 130 to serve as the carpet 20 side. The third fiber layer 130 has an approximately uniform weight per unit area. The third fiber layer 130 shown in FIG. 3 is integrated with the second fiber layer 120 formed on the first fiber layer 110 and the opposite surface 111 to the first fiber layer 110 on which the fibers of the second fiber layer 120 do not exist (are not present). Note that the weight per unit area of each layers 110, 120, 130 and the weight per unit area of the silencer 1 are calculated based on the weight per unit area on a virtual plane orthogonal to the thickness direction D3 of the silencer 1.

Since the fibers of the second fiber layer 120 exist partly (are partly present) on the opposite surface 111 to the first molded surface 11 on the first fiber layer 110, the weight per unit area of the silencer 1 is partly different. In addition, the second molded surface 12 formed on the third fiber layer 130 is a concave-convex surface 140. A convex portion 141 and a concave portion 142 are formed on the concave-convex surface 140. The convex portion 141 roughly corresponds to the portion where the fibers of the second fiber layer 120 exist. The concave portion 142 roughly corresponds to the portion where the fibers of the second fiber layer 120 do not exist. The convex portion 141 includes a relatively high convex portion 141a and a relatively low convex portion 141b.

Figure 4:
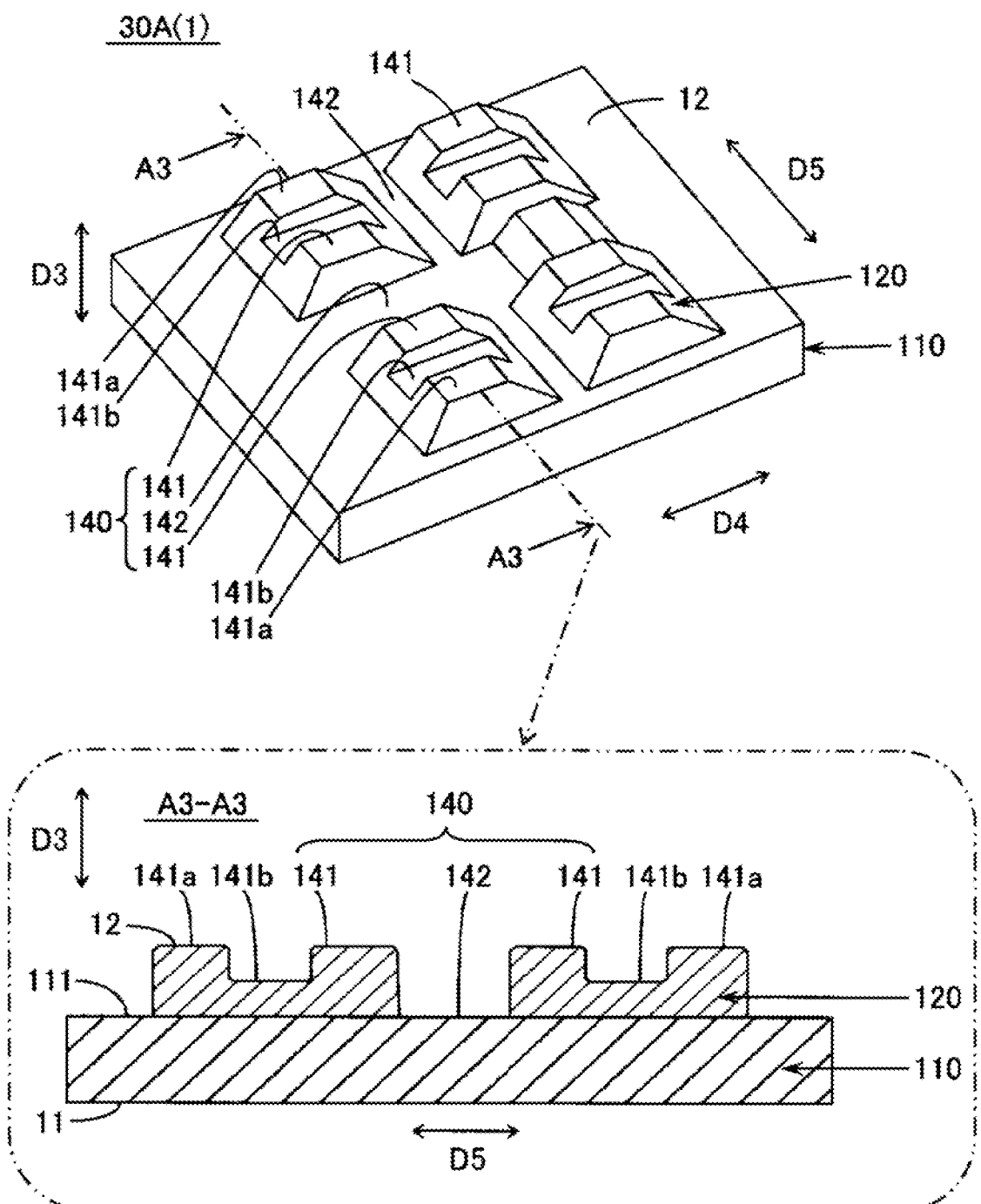
FIG. 4 is a drawing schematically showing another example of the silencer.

In addition, as exemplified in FIG. 4, the silencer 1 without including the third fiber layer 130 is also included in the present technology. The lower part of FIG. 4 schematically shows an example of a vertical cross-section cutting the silencer 1 at the position corresponding to A3-A3. Fiber assembly 30A, which is included in the concept of the fiber assembly 30, includes the first fiber layer 110 and the second fiber layer 120 without including the third fiber layer 130. Also in the silencer 1 shown in FIG. 4, since the fibers of the second fiber layer 120 exist partly on the opposite surface 111 to the first molded surface 11 on the first fiber layer 110, the weight per unit area of the silencer 1 is partly different.

The second fiber layer 120 and the second molded surface 12, which is formed on the first fiber layer 110 on which the fibers of the second fiber layer 120 do not exist, are the concave-convex surface 140. A convex portion 141 and a concave portion 142 are formed on the concave-convex surface 140. The convex portion 141 roughly corresponds to the portion where the fibers of the second fiber layer 120 exist. The concave portion 142 roughly corresponds to the portion where the fibers of the second fiber layer 120 do not exist. The convex portion 141 includes a relatively high convex portion 141a and a relatively low convex portion 141b.

In FIG. 2, the fiber layers 110, 120, 130 are shown as the fiber assembly 30 as a whole.

On an outer surface 30a of the front side (carpet 20 side) of the fiber assembly 30 shown in FIG. 2, a concave portion 31 recessed toward the vehicle body panel 80 side is formed. In a lower part of FIG. 2, the fiber assembly 30 and the buffer material 40 are shown in a disassembled state for convenience of the explanation. In the enlarged views of before and after disassembled, the horizontal to vertical ratio is different from that of the figure before enlargement to make the explanation easier. When the concave-convex surface is formed on the vehicle body panel 80, as shown in the enlarged view, the concave-convex surface 140 having the convex portion 141 and the concave portion 142 can be formed on an outer surface 30b (second molded surface 12) located at the reverse side (vehicle body panel 80 side) of the fiber assembly 30.

As shown in the enlarged view before disassembled in FIG. 2, the buffer material 40 is inserted into the concave portion 31, the bottom portion 31b of the concave portion 31 is adhered to on an outer surface 40b of the back side (vehicle body panel 80 side) of the buffer material 40, and the side portion 31a of the concave portion 31 is adhered to on the circumferential portion 40c of the buffer material 40. Here, the circumferential portion 40c of the buffer material is a portion surrounding the outer surfaces 40a, 40b at a position between the outer surfaces 40a, 40b. The bottom portion 31b of the concave portion 31 shown in FIG. 2 means a surface (portion) approximately perpendicular (crossing) to the thickness direction D3 in the concave portion 31. The side portion 31a of the concave portion 31 shown in FIG. 2 means a surface (portion) surrounding the bottom portion 31b in the concave portion 31. An outer surface 30a of the front side of the fiber assembly 30 located around the concave portion 31 and an outer surface 40a of the front side of the buffer material 40 correspond to the first molded surface 11. On the other hand, on an outer surface 30b of the back side of the fiber assembly 30, the concave portion into which the buffer material is inserted is not formed. Accordingly, the outer surface 30b of the back side corresponds to the second molded surface 12. The outer surface of the buffer material 40 is not included in the second molded surface 12.

The buffer material 40 shown in FIG. 2 has approximately rectangular shape in a cross section along the thickness direction D3 when macroscopically seen. The buffer material 40 is formed in a three-dimensional shape having a size of substantially filling the concave portion 31 of the fiber assembly. Since the thickness of the buffer material 40 is substantially matched to the depth of the concave portion 31, the buffer material 40 inserted into the concave portion 31 is not protruded (convex shape) from the outer surface 30a of the front side located around the buffer material 40. Thus, the outer surface 40a of the front side of the buffer material 40 and the outer surface 30a of the front side of the fiber assembly 30 become approximately flat. Accordingly, the floor carpet 20 near the foot is not projected, and the feeling when stepped on the floor carpet 20 is good. When the difference in level between the outer surface 40a of the front side of the buffer material and the outer surface 30a of the front side of the fiber assembly is 0.3 times or less of the thickness of the buffer material 40 (more preferably 0.2 times or less, furthermore more preferably 0.1 times or less), the outer surface 40a of the front side of the buffer material and the outer surface 30a of the front side of the fiber assembly are approximately flat.

Although the fibers 34 constituting the fiber assembly 30 shown in FIG. 2 are oriented randomly, the fibers 34 can be oriented along the outer surfaces 30a, 30b of the front and back sides, for example. Accordingly, when the fibers 44 of the buffer material 40 are oriented in the thickness direction D3, the orientation of the fibers 34 of the fiber assembly 30 can be different from the orientation of the fibers 44 of the buffer material 40. For the fibers 34, cotton shoddy, fibers of the synthetic resin (inclusive of elastomers), fibers obtained by adding an additive to a synthetic resin, inorganic fibers and combination of the above described fibers can be used for example, and fibers including a thermoplastic fiber are preferred. As shown in FIG. 2, the fibers 34 can include the main fiber 35 and the adhesive fiber (binder) 36.

The weight per unit area of the fiber assembly 30 is preferably about 600 to 3000 g/m$^2$, and more preferably about 800 to 2000 g/m$^2$.

At the portion other than the lamination portion 10, the thickness of the fiber assembly 30 is arbitrarily specified according to the vehicle shape within the range of about 10 to 100 mm for example, more preferably within the range of about 15 to 70 mm, further more preferably within the range of about 20 to 50 mm. At the portion other than the lamination portion 10, the density of the fiber assembly 30 is preferably about 0.02 to 0.15 g/cm$^3$, more preferably about 0.03 to 0.10 g/cm$^3$. The density of the lamination portion 10 of the fiber assembly 30 is preferably about 0.03 to 0.20 g/cm$^3$, more preferably about 0.04 to 0.15 g/cm$^3$.

The buffer material 40 can be inserted into the fiber assembly 30. For the buffer material 40, a foamed molded body, a resin molded body and the buffer material in which the fibers are oriented in the thickness direction can be used, for example.

For the material of the foamed molded body, a material formed by foaming resin molding material containing synthetic resin is preferred in a viewpoint of increasing the cushioning performance. For the resin molding material to be foamed, the resin molding material including thermoplastic resin is preferred in a viewpoint of easiness of molding. For the thermoplastic resin, polystyrene (PS), polypropylene (PP), polyethylene (PE), acrylic-styrene and combination of the above described fibers can be used, for example. The resin molding material can include additives such as filler material. When the buffer material 40 is formed by foaming the thermoplastic resin, a beads foamed molded body can be formed by impregnating a foaming agent into a bead-shaped or cylindrical-shaped plastic to form a large number of resin particles prefoamed to a predetermined magnification, then filling the large number of resin particles into a mold having the shape of the buffer material 40, and further heating and foaming the resin particles to form the beads foamed molded body by fusion-molding. Alternatively, the buffer material 40 can be formed by injecting foamable resin molding material into a mold having the shape of the buffer material 40 so that the foamable resin molding material is formed. For the foaming agent, volatile foaming agents (e.g. butane and pentane) for generating hydrocarbon and inorganic foaming agents (e.g. ammonium carbonate) for generating carbon dioxide or other gasses can be used. An expansion ratio of the foamed molded body can be approximately 10 to 50 times, for example. A density of the foamed molded body can be approximately 0.02 to 0.1 g/cm$^3$, for example.

For the resin molding material for forming the above described resin molded body, the resin molding material including thermoplastic resin is preferred in a viewpoint of easiness of molding. For the thermoplastic resin, PS, PP, PE, acrylic-styrene and combination of the above described fibers can be used, for example. The resin molding material can include additives such as filler material. The buffer material 40 can be formed by injecting the resin molding material into a mold having the shape of the buffer material 40. Of course, the resin molding material is not limited to the injection molded body.

Figure 5:
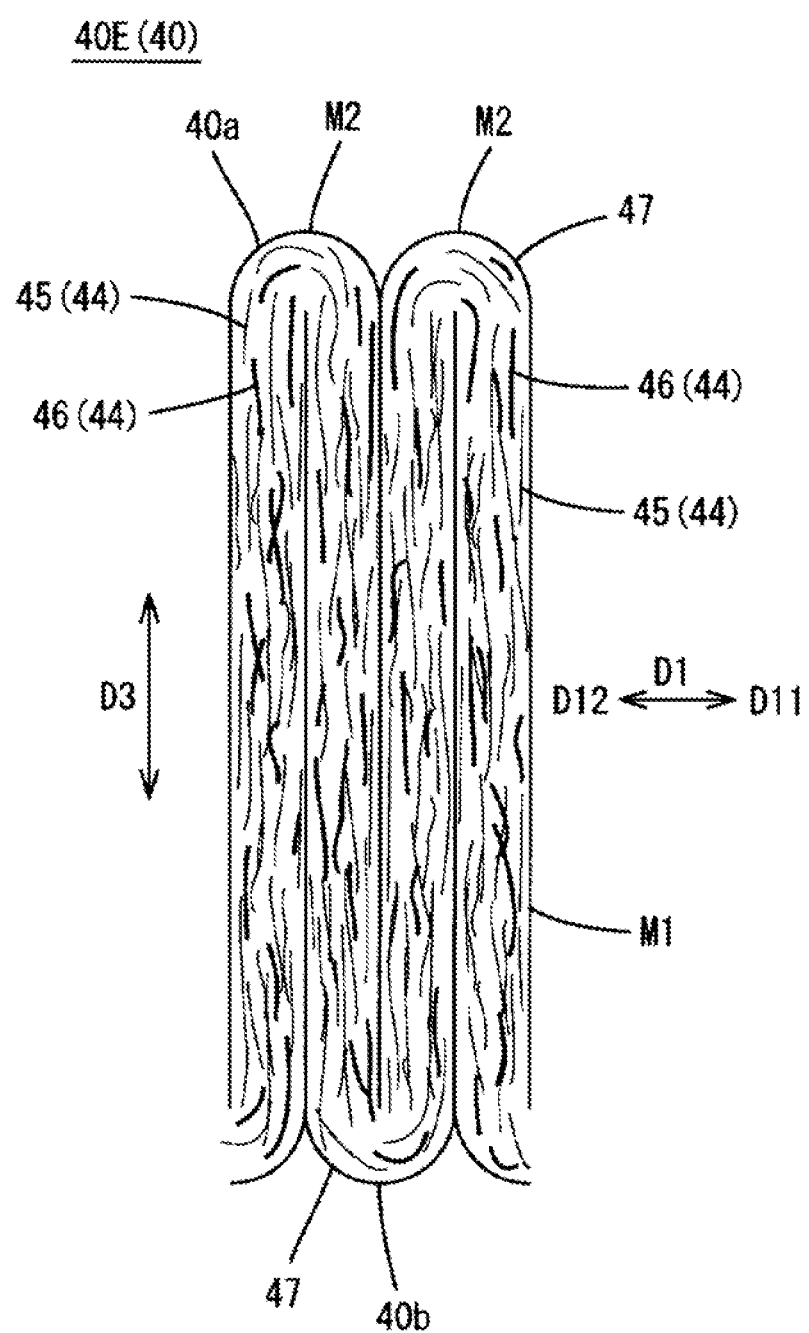
FIG. 5 is a side view schematically exemplifying a main portion of a buffer material 40E in which folded-back portions 47 are kept remained.

FIG. 5 schematically exemplifies the buffer material 40 in which the fibers are orientated in the thickness direction D3. The buffer material 40 is a fiber structure having a wavelike shape formed by repeatedly folding back the web M1 in the thickness direction D3. Thus, the buffer material 40 is light weight, bulky, and has soundproof performance. In particular, compressive strength in the thickness direction D3 is high. Since the fibers 44 of the buffer material 40 are oriented in the thickness direction D3, the buffer material 40 is hardly more deformed than the fiber assembly 30 when press molding is performed. Thus, the silencer 1 having high compressive strength in the thickness direction D3 can be obtained. For the fibers 44, same as the fibers 34 of the fiber assembly, cotton shoddy, fibers of the synthetic resin (inclusive of elastomers), fibers obtained by adding an additive to a synthetic resin, inorganic fibers and combination of the above described fibers can be used for example, and fibers including a thermoplastic fiber are preferred. As shown in FIG. 5, the fibers 44 can include the main fiber 45 and the adhesive fiber (binder) 46.

A thickness of the web M1 before folded can be, for example, about 5 to 10 mm, which is about 3 to 30% of a thickness of the buffer material 40. In addition, the number of folds (number of pleats) of the web M1 can be about 1 to 10 per 20 mm, for example. As the number of folds per unit length becomes smaller, the density of the web M1 decreases, and therefore the web M1 can be formed easier. On the other hand, as the number of folds per unit length becomes larger, the density of the web M1 increases, and therefore shape retaining property is improved and load bearing capacity as a raising material is increased. Note that the number of folds of the web is defined by the number of pleats, and therefore the number of the web per unit length is twice as much as the number of folds.

For manufacturing a buffer material in which a continuous web is repeatedly folded into a wavelike shape and laminated, a manufacturing apparatus can be appropriately selected from various buffer material manufacturing apparatuses using a known manufacturing method such as a STRUTO method.

For the buffer material manufacturing apparatus, a textile lap machine described in Japanese Translation of PCT Application No. 2008-538130, and a machine for repeatedly folding a continuous web into a wavelike shape by gears are known, for example.

In the buffer material 40E shown in FIG. 5 and FIG. 6A, the folded-back surfaces of each of pleats M2 are matched with a plane passing through the width direction D2 and the thickness direction D3 of the buffer material 40E, and the main fiber 45 and the adhesive fiber 46 are oriented in the thickness direction D3, except in the folded-back portions 47. A part of the adhesive fibers 46 is melted and bonds the main fibers 45, which are oriented in a wavelike shape, with each other. As a result, the fiber structure having the wavelike shape is formed. An outer surface 40a of the front side and an outer surface 40b of the back side where the folded-back portions 47 are assembled are formed along the lamination direction D1 of pleats M2 (web M1). The lamination direction D1, the width direction D2 and the thickness direction D3 are approximately perpendicular to each other. Here, the width direction D2 of the buffer material 40E corresponds to the width direction of the web M1. In FIG. 3 and other figures, an extruding direction D11 of the buffer material 40E extruded by the buffer material manufacturing apparatus is shown as one direction of the lamination direction D1, and an opposite direction D12 of the extruding direction D11 is shown as the other direction of the lamination direction D1. If the fibers 44 are oriented in the thickness direction D3, it means that an orientation direction of the fibers 44 matches relatively well with a direction perpendicular to the front surface (40a) and the back surface (40b) in a narrow sense. In addition, the folded-back portion 47 can be formed.

For the main fiber 45 of the buffer material 40 and the main fiber 35 of the fiber assembly 30, fibers of thermoplastic resins (inclusive of thermoplastic elastomers), fibers obtained by adding an additive to thermoplastic resins, inorganic fibers and reclaimed cotton shoddy can be used, for example. In addition, fibers composed of thermoplastic resins such as a polyester (e.g. polyethylene terephthalate (PET)), a polyolefin (e.g. PP) and a polyamide, fibers composed of thermoplastic resins obtained by modifying the aforementioned thermoplastic resins to adjust a melting point thereof, glass fibers, rayon fibers, cotton shoddy of clothing, regenerated cotton fibers, fibers of materials obtained by further adding an additive, and combinations of these fibers can be also used, for example. A fiber diameter of the main fibers can be about 5 to 60 μm, and a fiber length of the main fibers can be about 10 to 100 mm, for example. When the main fibers are thermoplastic fibers, a melting point of the thermoplastic fibers can be high melting point of about 180 to 260° C., for example. The main fiber 45 of the buffer material and the main fiber 35 of the fiber assembly can be the same fiber or can be different fibers.

For the adhesive fiber 46 of the buffer material 40 and the adhesive fiber 36 of the fiber assembly 30, thermoplastic fibers and fibers obtained by adding an additive to thermoplastic resins can be used, for example. In addition, fibers composed of thermoplastic resins such as a polyester (e.g. PET), a polyolefin (e.g. PP and PE (polyethylene)) and a polyamide, fibers composed of thermoplastic resins obtained by modifying the aforementioned thermoplastic resins to adjust a melting point thereof, and fibers of materials obtained by further adding an additive can also be used, for example. When the main fibers are thermoplastic fibers, thermoplastic fibers having a melting point lower than the melting point of the main fibers are preferably used for the adhesive fibers. For example, when fibers having compatibility with the main fibers are used for the adhesive fibers, good adhesion between the main fibers and adhesive fibers can be obtained, and the buffer material 40 and the fiber assembly 30 can be provided with sufficient shape retaining property. A melting point of the adhesive fibers can be about 100 to 220° C. (preferably about 120° C. or less), for example. When the fiber of the same material is used both for the adhesive fibers 46, 36, adhesive performance between the fiber assembly 30 and the buffer material 40 is increased. Thus, the same material is preferred.

Fibers of a core-sheath structure can be used for the adhesive fibers 46, 36. The core-sheath structure is comprised of a sheath portion formed of fibers available for the adhesive fibers and a core portion formed of a material having a melting point higher than that of the sheath portion so that the sheath portion surrounds the outer circumference of the core portion. In this case, fibers available for the main fibers 45, 35 can be used for the core portion.

A fiber diameter of the adhesive fibers 46, 36 can be about 10 to 45 μm, and a fiber length of the adhesive fibers 46 can be about 10 to 100 mm, for example. A compounding ratio of the main fibers 45, 35 and adhesive fibers 46, 36 can be about 50 to 90 wt. % for the main fibers and about 10 to 50 wt. % for the adhesive fibers.

Note that the fiber structure 40 can be also formed by using a non-fibrous binder instead of the adhesive fibers.

The weight per unit area of the buffer material 40 in which the fibers are orientated in the thickness direction is preferably about 300 to 1500 g/m$^2$, and more preferably about 500 to 800 g/m$^2$. Note that the weight per unit area of the fiber assembly 30 is preferably larger than the weight per unit area of the low-density buffer material 40. The thickness of the buffer material 40 is arbitrarily specified according to the vehicle shape within the range of about 10 to 50 mm, for example. The density of the buffer material 40 is preferably equal to or lower than the density of the fiber assembly 30, more preferably lower than the density of the fiber assembly 30. Specifically, the density of the buffer material 40 is preferably about 0.01 to 0.15 g/cm$^3$, more preferably 0.02 to 0.08 g/cm$^3$. In particular, the density of the lamination portion 10 of the fiber assembly 30 is preferably equal to or larger than the density of the buffer material 40 (more preferably larger than the density of the buffer material 40) because vibration control performance is improved by suppressing the vibration from the vehicle body panel 80.

The buffer material 40 can be any structure as long as the fibers 44 are oriented in the thickness direction D3. Accordingly, as shown in FIG. 6B, the folded-back portions 47 of the outer surfaces 40a, 40b of the buffer material 40 can be cut out. Further, the buffer material obtained by dividing the fiber structure having a wavelike shape at an intermediate position in the thickness direction can be used.

The thickness direction of the buffer material 40 in the present technology can be any direction as long as the direction is crossing the first and second molded surfaces 11, 12 shown in FIG. 2. Thus, the thickness direction is not limited to the direction exactly the thickness direction of the silencer 1 having unevenness. The thickness direction can be the direction deviated from the thickness direction of the silencer 1.

Figure 7A:
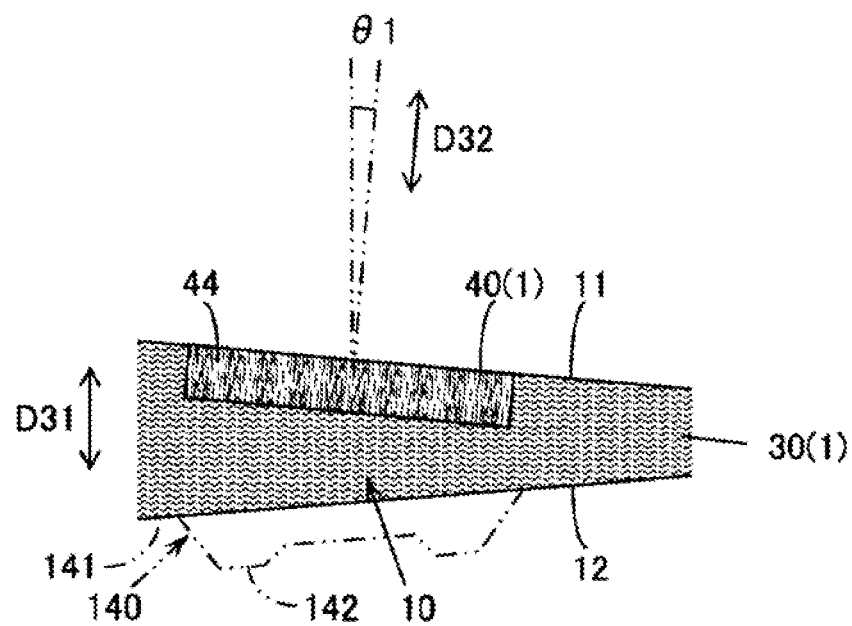
FIGS. 7A and 7B are drawings schematically exemplifying a vertical end surface of another silencer 1 cut at the position corresponding to A1-A1 in FIG. 1.

In the example shown in FIG. 7A, the thickness of the silencer 1 is not constant and deviated from a compression direction D31 to a thickness direction D32 of the buffer material 40. Here, the compression direction D31 is an approach direction of molds 212, 214 of a press molding machine 200 exemplified in FIG. 10. The compression direction D31 is a direction of applying compression force when press molding is performed. The compression direction D31 can be replaced with the thickness direction of whole the silencer 1. An angle θ1 formed by the compression direction D31 and the thickness direction D32 of the buffer material is preferably 30° or less, and more preferably 25° or less, further more preferably 20° or less, and particularly preferably 15° or less in a viewpoint of obtaining good compressive strength in the compression direction D31. Of course, the present invention also includes the case of θ1>0.

Figure 7B:
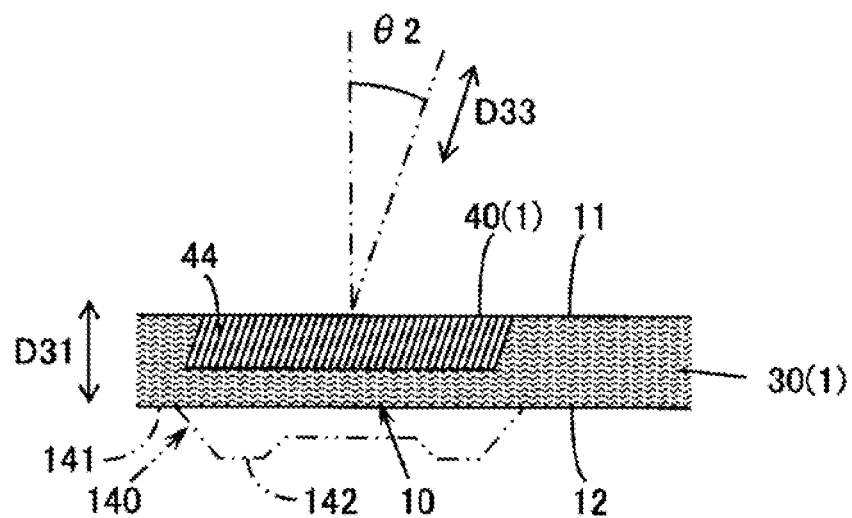

As exemplified in FIG. 7B, when the compression force is applied by the press molding, the direction of the fibers 44 of the buffer material 40 may be deviated from the thickness direction of the buffer material 40 and deviated from the compression direction D31. An angle θ2 formed by the compression direction D31 and a direction D33 of the fibers 44 is preferably 30° or less, more preferably 25° or less, further more preferably 20° or less, and particularly preferably 15° or less in a viewpoint of obtaining good compressive strength in the compression direction D31. Of course, the present invention also includes the case of θ2>0.

For the buffer material 40, the foamed molded body such as a formed body of resin particles and the injection molded body can be used in combination so as to be adjacent to the fiber assembly 30 or laminated on the fiber assembly 30. For example, when hard components such as a duct is arranged on the floor panel, the silencer should be cut out only at the potion of the hard components in some cases. In this case, the feeling of stepping of the silencer 1 varies between the portion where the components such as a duct is arranged and the other general portions unless the buffer material 40 is not present. In order to increase the comfortable feeling of stepping of the silencer 1, a relatively hard formed body of resin particles or a relatively hard injection molded body can be inserted into the portion where the components such as a duct is arranged and the neighboring portion. Alternatively, the foamed body of resin particles or the injection molded body can be inserted in combination into the buffer material in which the fibers are orientated in the thickness direction.

(3) Manufacturing Method, Operation and Effect of the Silencer

Figure 8:
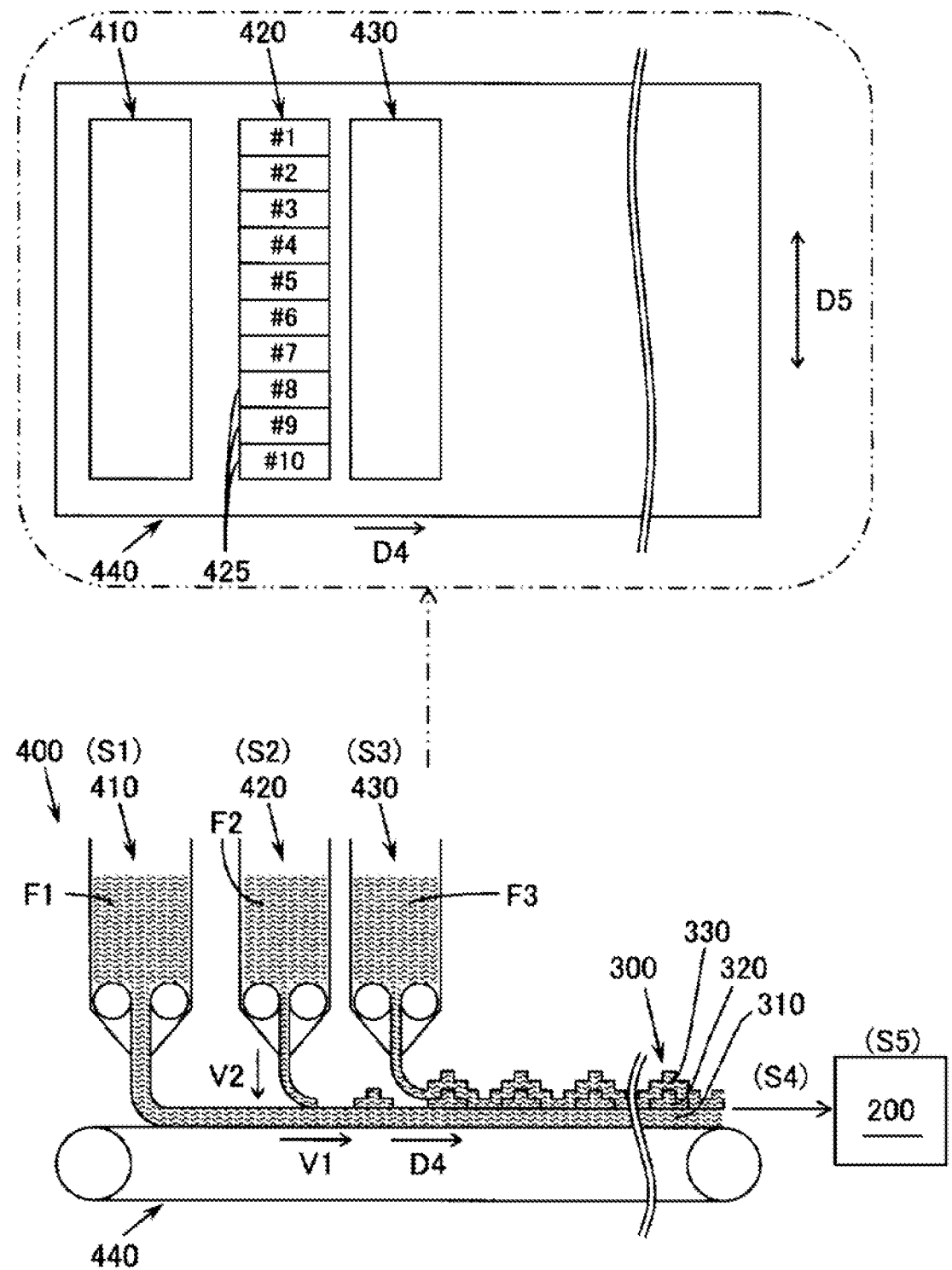
FIG. 8 is a drawing schematically showing an example of a silencer manufacturing apparatus.
Figure 10:
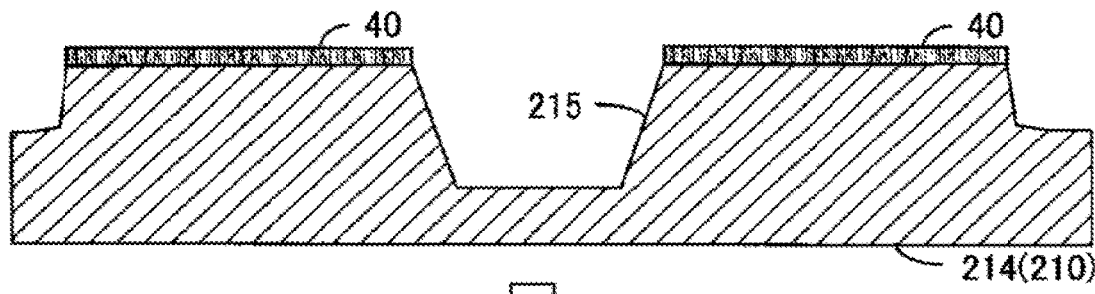
FIG. 10 is a vertical end surface view for explaining an example of a molding process.
Figure 10:
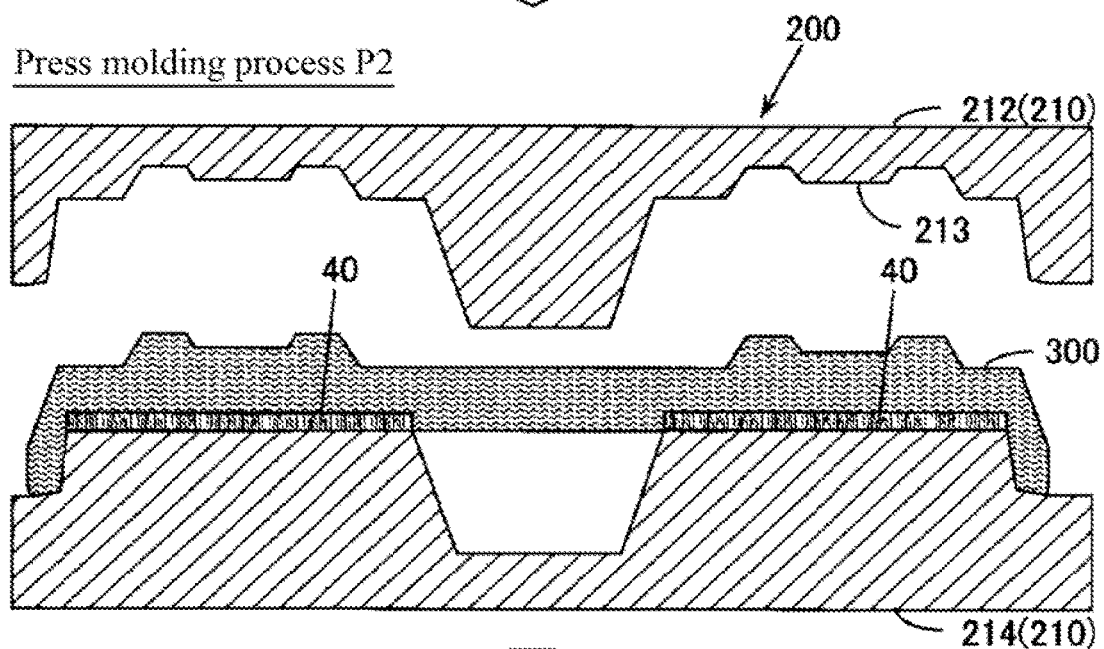
Figure 10:
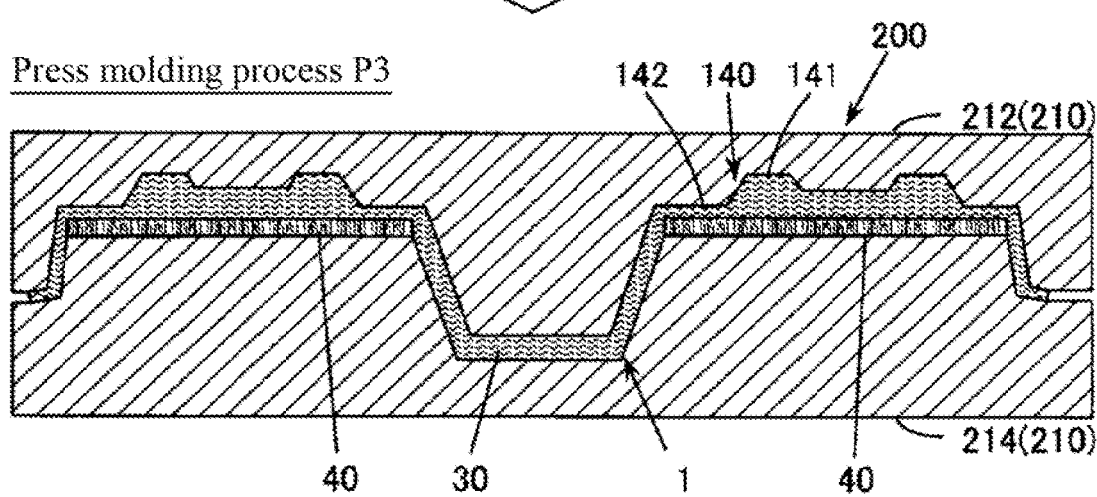

FIG. 8 schematically shows an example of a silencer manufacturing apparatus for manufacturing the silencer 1 for automobile. FIG. 9 schematically shows an example of a controller of the silencer manufacturing apparatus. FIG. 10 schematically shows a vertical end surface of the press molding machine 200.

A silencer manufacturing apparatus 400 shown in FIG. 8 includes a first fiber supply unit 410 for feeding the fibers F1 downward, a second fiber supply unit 420 for feeding the fibers F2 downward, a third fiber supply unit 430 for feeding the fibers F3 downward, a conveyer 440, a controller 450 (shown in FIG. 9), and a press molding machine 200. The above described fibers 34 can be used for the fibers F1 to F3. The same kind of fiber can be used for all of the fibers F1 to F3. Alternatively, the fibers different from each other can be used for each of the fibers F1 to F3. Of course, the same kind of fiber can be used for the fibers F2, F3, while the fiber different from the fibers F2, F3 is used for the fibers F1. Alternatively, the same kind of fiber can be used for the fibers F1, F3, while the fiber different from the fibers F1, F3 is used for the fibers F2. Alternatively, the same kind of fiber can be used for the fibers F1, F2, while the fiber different from the fibers F1, F2 is used for the fibers F3. When forming the silencer 1 without having the third fiber layer 130, the third fiber supply unit 430 can be omitted.

The first fiber supply unit 410 defibrates and mixes the raw yarn for the fibers F1, and supplies the fibers F1 on the conveyer 440 moving in the moving direction D4 so that the thickness and the weight per unit area become nearly constant. Thus, the first supply fiber layer 310 is formed. Accordingly, the first fiber supply step S1 is performed mainly by the first fiber supply unit 410 and the conveyer 440. The first supply fiber layer 310 is the fiber aggregate having nearly constant thickness and weight per unit area. The first supply fiber layer 310 becomes the first fiber layer 110 of the silencer 1.

The first fiber layer 110 has an approximately flat surface forming the first molded surface 11. The first fiber layer 110 gives the shape retaining property as a base layer. Hence, the floor surface can be approximately flattened by arranging the floor silencer on the floor portion so that the first fiber layer 110 is arranged on the vehicle compartment C1 side. When the first fiber layer 110 forming the floor silencer is arranged on the vehicle compartment side, the first fiber layer 110 having high surface rigidity is preferably used for keeping the performance (feeling) when stepped on by the foot. In this case, it is preferable that the fibers F1 are easy to melt and the surface rigidity of the first fiber layer is high after the fibers F1 are formed.

The first fiber supply unit 410 can be formed on the conveyer 440 by feeding the first supply fiber layer 310 in the state of the fiber instead of feeding the wound raw fabric preliminarily manufactured in a separate process. The first fiber layer 110 serving as the base layer is formed from the state of the fiber through an integrated process together with other fiber layers 120, 130. Thus, the present manufacturing method can reduce manufacturing man-hours and manufacturing cost of the silencer.

The second fiber supply unit 420, which is arranged on the downstream side of the first fiber supply unit 410 in the moving direction D4 of the conveyer 440, defibrates and mixes the raw yarn for the fibers F2, and supplies the fibers F2 on the first supply fiber layer 310 moving in the moving direction D4 so that the thickness and the weight per unit area become partly different. Thus, the second supply fiber layer 320 is formed. Accordingly, the second fiber supply step S2 is performed mainly by the second fiber supply unit 420 and the conveyer 440. The second supply fiber layer 320 becomes the second fiber layer 120 of the silencer 1. The second fiber supply unit 420 shown in FIG. 8 includes a plurality of divided fiber supply units 425 having the supply positions of the fibers F2, and each of the supply positions is different in the width direction D5 of the conveyer 440. Each of the divided fiber supply units 425 has a function of measuring the fibers F2. A plurality of divided fiber supply units 425 can be arranged in a line in the width direction D5 as shown in FIG. 8 or can be arranged in zigzag. It is preferred that the divided fiber supply units 425 are arranged in zigzag since a larger number of divided fiber supply units 425 can be arranged.

From each of the divided fiber supply units 425, an arbitrary amount of the fibers F2 can be deposited on the upper surface of the first supply fiber layer 310 transferred by the conveyer 440 at an arbitrary position. The controller 450 controls for supplying the fibers F2 only to the preliminarily set region on the first supply fiber layer 310. Further, the controller 450 controls a supply amount of the fibers F2 for the region to which the fibers F2 are supplied. Consequently, the silencer 1 for automobile can be formed as the molded body having partly different thickness and partly different weight per unit area. Hence, followability to the vehicle body panel is increased and the weight per unit area is increased at a portion from which vehicle exterior noise easily enters. Thus, the silencer for automobile capable of suppressing increase of weight and enhancing sound absorbing performance can be provided.

For the second supply fiber layer 320, light weight and bulky fiber is preferred. For the fibers F2, highly crimped fibers, cotton shoddy and longitudinally oriented fibers are preferably used.

In the manufacturing method of the present example, the presence/absence of the fibers F2 and the supply amount of the fibers F2 are changed for each of the separated region of the upper surface of the first supply fiber layer 310 which functions as a base layer. Thus, a fiber aggregate 300 having partly different thickness and partly different weight per unit area is formed. Accordingly, in the fiber aggregate 300 of the present invention, the shape retaining property and transportability are enhanced compared to the fiber aggregate without having the base layer. In addition, the shape retaining property of the silencer 1 made from the fiber aggregate 300 is also enhanced.

The third fiber supply unit 430, which is arranged on the downstream side of the second fiber supply unit 420 in the moving direction D4 of the conveyer 440, defibrates and mixes the raw yarn for the fibers F3, and supplies the fibers F3 on the supply fiber layers 310, 320 moving in the moving direction D4 so that the thickness and the weight per unit area become nearly constant. Thus, the third supply fiber layer 330 is formed. Namely, the fibers F3 are laid on the second supply fiber layer 320 and the first supply fiber layer 310 on which the fibers F2 of the second supply fiber layer 320 do not exist. Accordingly, the third fiber supply step S3 is performed mainly by the third fiber supply unit 430 and the conveyer 440. The third supply fiber layer 330 becomes the third fiber layer 130 of the silencer 1. The fiber aggregate 300 including the supply fiber layers 310, 320, 330 becomes the fiber assembly 30.

Since the third supply fiber layer 330 covering the second supply fiber layer 320 is present in the fiber aggregate 300, the fiber aggregate 300 and the fiber assembly 30 after molding are prevented from being cracked or peeled from the unevenness. It is found that the vibration control performance is deteriorated when the silencer is installed in for automobile while the first fiber layer 110 faces the vehicle compartment side and the above described crack or peeling occurs. It is assumed that the vibration control performance is deteriorated because the contact area between the silencer and the vehicle body panel is reduced when the crack or peeling occurs. Since the third supply fiber layer 330 is formed on the supply fiber layers 310, 320, the second supply fiber layer 320 having partly different weight per unit area is sandwiched by the first supply fiber layer 310 and the third supply fiber layer 330. Because of this, the surface quality and the shape retaining property of the silencer 1 are enhanced and the vibration control performance of the vehicle body panel is increased. Consequently, quietness in the vehicle compartment can be improved.

For the fibers F3, flexible fibers easily adherable to the vehicle body panel are preferred. In this case, fine-denier fibers are preferably used for the fibers F3, and the ratio of the melt fibers is preferably as small as possible.

The supply fiber layers 310, 320, 330 are placed on the conveyer 440 and transferred in the moving direction D4. For the conveyer 440, a belt conveyor can be used, for example. It is preferred to form a large number of ventilation holes on the belt of the belt conveyor in order to pre-heat the fiber aggregate 300 at a temperature a little higher than a melting point of the adhesive fiber 36 by a hot air heating or the like.

The controller 450 controls a moving speed V1 of the conveyer 440 and supplying speed of the fibers F1 to F3 supplied from the fiber supply units 410, 420, 430, for example. In particular, the controller 450 shown in FIG. 9 controls the weight per unit area of the fibers F2 supplied from the divided fiber supply units 425 to the first supply fiber layer 310 variably and individually by the divided fiber supply unit 425 in accordance with a sequence 455 configuring a control program. FIGS. 8, 9 show that the second fiber supply unit 420 is divided into the divided fiber supply units #1 to #10. Of course, the number of the divided fiber supply units 425 arranged on the second fiber supply unit 420 is not limited to 10.

The sequence 455 shown in FIG. 9 indicates a ratio V2/V1 of a supply speed (supply amount) V2 (m/second) of the fibers F2 with respect to the moving speed (line speed) V1 (m/second) of the conveyer 440 for each of the divided fiber supply units #1 to #10 for each predetermined timing. A horizontal axis shown in FIG. 9 indicates a timing t. FIG. 9 shows that the speed ratio V2/V1 is changed from the left to right for each of the divided fiber supply units #1 to #10. For example, the speed ratio V2/V1 of the divided fiber supply unit #2 changes 0, 1, 2, 3, 4, 4, 3, 2, 1, 0, . . . . When the speed ratio V2/V1 is 0, the fibers F2 are not supplied on the first supply fiber layer 310 at the region determined by the position and the timing of the divided fiber supply units. When the speed ratio V2/V1 is 1, the supply speed V2 of the fibers F2 is same as the moving speed (line speed) V1 of the first supply fiber layer 310. When the speed ratio V2/V1 is larger than 1 (e.g., 4), the fibers F2 are supplied on the first supply fiber layer 310 in a wavelike shape while the first supply fiber layer 310 is moved in the moving speed V1. If the speed ratio V2/V1 is controlled in the range of V2/V1>1, the second supply fiber layer 320 and the second fiber layer 120 can be folded in a wavelike shape so that the fibers F2 are orientated in the thickness direction D3. By controlling the speed ratio V2/V1 variably for each timing, the thickness and the weight per unit area of the second supply fiber layer 320 are changed according to the position of the conveyer 440 in the moving direction D4.

By controlling the speed ratio V2/V1 variably for each of the divided fiber supply units #1 to #10, the thickness and the weight per unit area of the second supply fiber layer 320 are changed according to the position of the conveyer 440 in the width direction D5. For example, in the sequence 455 shown in FIG. 9, the speed ratio V2/V1 of the fourth region from the left is 0, 3, 2, 3, 0, 0, 3, 2, 3 and 0 in the order of the divided fiber supply units #1 to #10.

As explained above, the manufacturing method of the present example can form the second supply fiber layer 320 having the desired thickness and weight per unit area for each of the regions sectioned by the moving direction D4 and the width direction D5. The area and the number of the regions for controlling the supply amount of the fibers can be arbitrarily specified by controlling the number of the divided fiber supply units 425 to be installed, the supply speed (V2) of the fibers F2 supplied from each of the divided fiber supply units 425 and the line speed (V1) of the conveyer 440. The supply amount of the fibers can be changed for each of the regions by specifying the supply amount (V2) of the fibers F2 in the sequence 455.

The fiber aggregate 300 formed by the fiber supply steps S1, S2 and S3 is conveyed to the press molding machine 200 and press molded (molding step S5). Before the molding step S5, the fiber aggregate 300 can be pre-heated (preheating step S4). Of course, the manufacturing method without including the preheating step S4 is also included in the present technology. In the preheating step S4, the fiber aggregate 300 can be conveyed to a heater such as a suction heater (hot air circulation heater), and pre-heated at a temperature a little higher than a melting point of the adhesive fibers 36 by a hot air heating or the like. The adhesive fiber 36 of the fiber aggregate 300 is soften and functions as an adhesive. Thus, the shape of the fiber aggregate 300 is retained to a certain extent and the fiber aggregate 300 can be easily conveyed to the press molding machine 200. A radiation heating by the infrared radiation heater can be done simultaneously with the heating of the suction heater so as to ensure the sufficient amount of heat of the preheating. Of course, the heating can be done without using the suction heater.

In the preheating step S4, a preform can be formed by preliminary molding the fiber aggregate 300 in accordance with the shape of the silencer 1.

The matted or preformed fiber aggregate 300 is conveyed to the press molding machine 200 exemplified in FIG. 10. Here, as shown in the press molding process P1 shown in FIG. 10, the buffer material 40 can be preliminarily placed on a predetermined portion of a lower mold 214. The direction of the buffer material 40 in which the fibers are orientated in the thickness direction can be set so that the lamination direction D1 matches with the vehicle width direction or the width direction D2 matches with the vehicle width direction. Otherwise, the lamination direction D1 and the width direction D2 can be deviated from the vehicle width direction. As shown in the press molding process P2 shown in FIG. 10, the fiber aggregate 300 conveyed to the press molding machine 200 is laid on the lower mold 214 on which the buffer material 40 is placed.

In the press molding machine 200 shown in FIG. 10, an upper mold 212 and a lower mold 214 both constituting a forming die 210 are provided so that they can be brought close to each other and separate from each other. The upper mold 212 is a metal mold having a molding surface 213 on a facing surface so as to match with a shape of the vehicle body panel 80 side of the silencer 1. The lower mold 214 is a metal mold having a molding surface 215 on a facing surface so as to match with a shape of the carpet 20 side of the silencer 1. Accordingly, the fiber aggregate 300 and the buffer material 40 are arranged with their upper and lower sides reversed between the molds 212, 214. Of course, before performing the press molding, the materials can be arranged in accordance with the positional relation to be laid on the automobile, for example. Although the hot press accompanied with heating is preferred, the cold press without heating can be also used. For example, if the fiber aggregate 300 is heated enough to melt the adhesive fiber 36 before performing the press molding, the shape of the silencer 1 formed by the cold press is retained.

When the fiber aggregate 300 is laid on the lower mold 214 on which the buffer material 40 is placed as needed (press molding process P2) and the molds 212, 214 are brought close to each other, the silencer 1 before trimming is press molded (press molding process P3). Consequently, the first fiber layer 110 is formed from the first supply fiber layer 310, and the second fiber layer 120 is formed from the second supply fiber layer 320. In addition, when the third supply fiber layer 330 is present in the fiber aggregate 300, the third fiber layer 130 is formed from the third supply fiber layer 330. The first molded surface 11 is formed on the first fiber layer 110. When the third supply fiber layer 330 is present in the fiber aggregate 300, the second molded surface 12 is formed on the third fiber layer 130. The second fiber layer 120 is integrated with the opposite surface 111 to the first molded surface 11 on the first fiber layer 110. The second fiber layer 120 has partly different weight per unit area. When the third supply fiber layer 330 is present in the fiber aggregate 300, the second fiber layer 120 is also integrated with the third fiber layer 130. When the third supply fiber layer 330 is not present in the fiber aggregate 300, the second molded surface 12 is formed on the second fiber layer 120 and the first fiber layer 110 on which the fiber of the second fiber layer 120 do not exist.

When the buffer material 40 in which the fibers 44 are orientated in the thickness direction D3 is laid on the lower mold 214, the buffer material 40 has high compressive strength in the thickness direction D3. Further, the buffer material 40 is hardly deformed in the thickness direction D3 even when the press molding is performed. Hence, the material mainly compressed is the fiber aggregate 300. When the matted fiber aggregate 300 is used, the concave portion 31 is formed by making the buffer material 40 sink into the fiber aggregate 300 by the press molding. Even when using the preformed fiber aggregate 300, the fiber aggregate 300 located at the lamination portion 10 may be compressed by the press molding. The fiber assembly 30 located at the lamination portion 10 is more strongly compressed than the surrounding area. Thus, the density of the lamination portion 10 becomes high. Accordingly, vibration control performance, soundproof performance and sound insulation performance are increased. In particular, since the fiber assembly 30 is located at the vehicle body panel 80 side in the lamination portion 10, vibration control performance, soundproof performance and sound insulation performance are increased.

The silencer 1 before trimming is cooled and removed from the press molding machine 200, and then conveyed to an outer circumference cutting machine to cut the outer circumference. The cutting method can be a cutting using a cutting blade, a water jet cutting or cutting by hand using a cutter, for example. If required, holes penetrating in the thickness direction D3 can be formed on the silencer 1.

As explained above, the silencer 1 shown in FIGS. 3, 4 is formed. In the silencer 1, the fibers of the second fiber layer 120 exist partly while the second fiber layer 120 is integrated with the first fiber layer 110 on which the first molded surface 11 is formed. Thus, the first fiber layer 110 functions as a base layer and shape-retaining property is imparted to the silencer 1. Accordingly, the silencer 1 for automobile is capable of preventing the shape of the fiber molded body having partly different weight per unit area from being collapsed, being cracked, and so on.

(4) Variation Examples

Various variation examples can be considered in the present invention.

For example, in addition to the floor silencer for the vehicle compartment, the silencer for automobile of the present invention can be applied to a silencer for a luggage compartment, a silencer for a door part, a silencer for a ceiling part, a dash silencer, a silencer for an engine part and a silencer for a fender part.

Another layer such as an adhesive layer can be formed between the fiber assembly 30 and the buffer material 40, for example.

FIG. 11 schematically shows a vertical end surface of a silencer 1A of the variation example together with the vehicle body panel 80 and the carpet 20 cut at the position corresponding to A1-A1 in FIG. 1. Note that the concept of the silencer 1 described above includes the silencer 1A.

On the outer surface 30b of the back side (vehicle body panel 80 side) of the fiber assembly 30 shown in FIG. 11, a concave portion 31 recessed toward the carpet 20 side is formed. The buffer material 40 is inserted into the concave portion 31. The bottom portion 31b of the concave portion 31 is adhered to on the outer surface 40a located at the front side (carpet 20 side) of the buffer material 40. The side portion 31a of the concave portion 31 is adhered to on the circumferential portion 40c of the buffer material 40. The outer surface 30b of the back side of the fiber assembly 30 located around the concave portion 31 and the outer surface 40b of the back side of the buffer material 40 are the second molded surface 12. On the outer surface 30a of the front side of the fiber assembly 30, the concave portion into which the buffer material is inserted is not formed. Accordingly, the outer surface 30a of the front side is the first molded surface 11, and the outer surface of the buffer material 40 is not included in the first molded surface 11.

The outer surface 40b of the back side of the buffer material 40 and the outer surface 30b of the back side of the fiber assembly 30 become approximately flat. When the difference in level between the outer surface 40b of the back side of the buffer material and the outer surface 30b of the back side of the fiber assembly is 0.3 times or less of the thickness of the buffer material 40 (more preferably 0.2 times or less, furthermore more preferably 0.1 times or less), the outer surface 40b of the back side of the buffer material and the outer surface 30b of the back side of the fiber assembly are approximately flat.

Since the buffer material 40 in which the fibers are oriented in the thickness direction is located at the vehicle body panel 80 side, the load applied from the carpet 20 side to the vehicle body panel 80 side is supported by the fibers 44 oriented in the thickness direction D3 of the buffer material 40 via the fiber assembly 30. Accordingly, the variation example can provide the silencer for automobile having higher compressive strength in the thickness direction.

As shown in the variation example of FIG. 12A, the concept of the above described silencer 1 includes a silencer 1B. In the silencer 1B, the buffer material 40 is embedded in the fiber assembly 30. For example, in the silencer manufacturing apparatus 400 shown in FIG. 8, if the buffer material 40 is placed on the first supply fiber layer 310 at the position between the first fiber supply unit 410 and the third fiber supply unit 430, the buffer material 40 is embedded in the fiber aggregate 300 and the silencer 1B is formed by the press molding.

As shown in the variation example of FIG. 12B, the concept of the above described silencer 1 includes a silencer 1C. The silencer 1C includes buffer material 40 having an approximately trapezoidal cross section where the length L1 of the side of the first molded surface 11 side is different from the length L2 of the second molded surface 12 side in the cross section along the thickness direction D3. In the buffer material 40 having an approximately trapezoidal cross section, an area of the outer surface 40a of the front side is different from an area of the outer surface 40b of the back side. When the buffer material 40 is formed in an approximately trapezoidal cross section, adhesive strength between the buffer material 40 and the fiber assembly 30 becomes higher at the circumferential portion 40c compared to the buffer material 40 having a rectangular cross section. As shown in the buffer material 40 of FIG. 12B, when the length L1 of the side of the outer surface 40a included in the molded surface 11 is longer than the length L2 of the side of the outer surface 40b not included in the molded surfaces 11, 12, the width of the concave portion 31 of the fiber assembly 30 becomes wider as the position becomes shallower. Thus, the concave portion 31 can be easily formed. Accordingly, adhesive strength between the circumferential portion 40c of the buffer material and the side portion 31a of the concave portion becomes higher. When the length L1 of the side of the outer surface 40a included in the molded surface 11 is shorter than the length L2 of the side of the outer surface 40b not included in the molded surfaces 11, 12, the concave portion 31 of the fiber assembly 30 becomes narrower as the position becomes shallower. Thus, adhesive strength between the circumferential portion 40c of the buffer material and the side portion 31a of the concave portion becomes higher.

Figure 13:
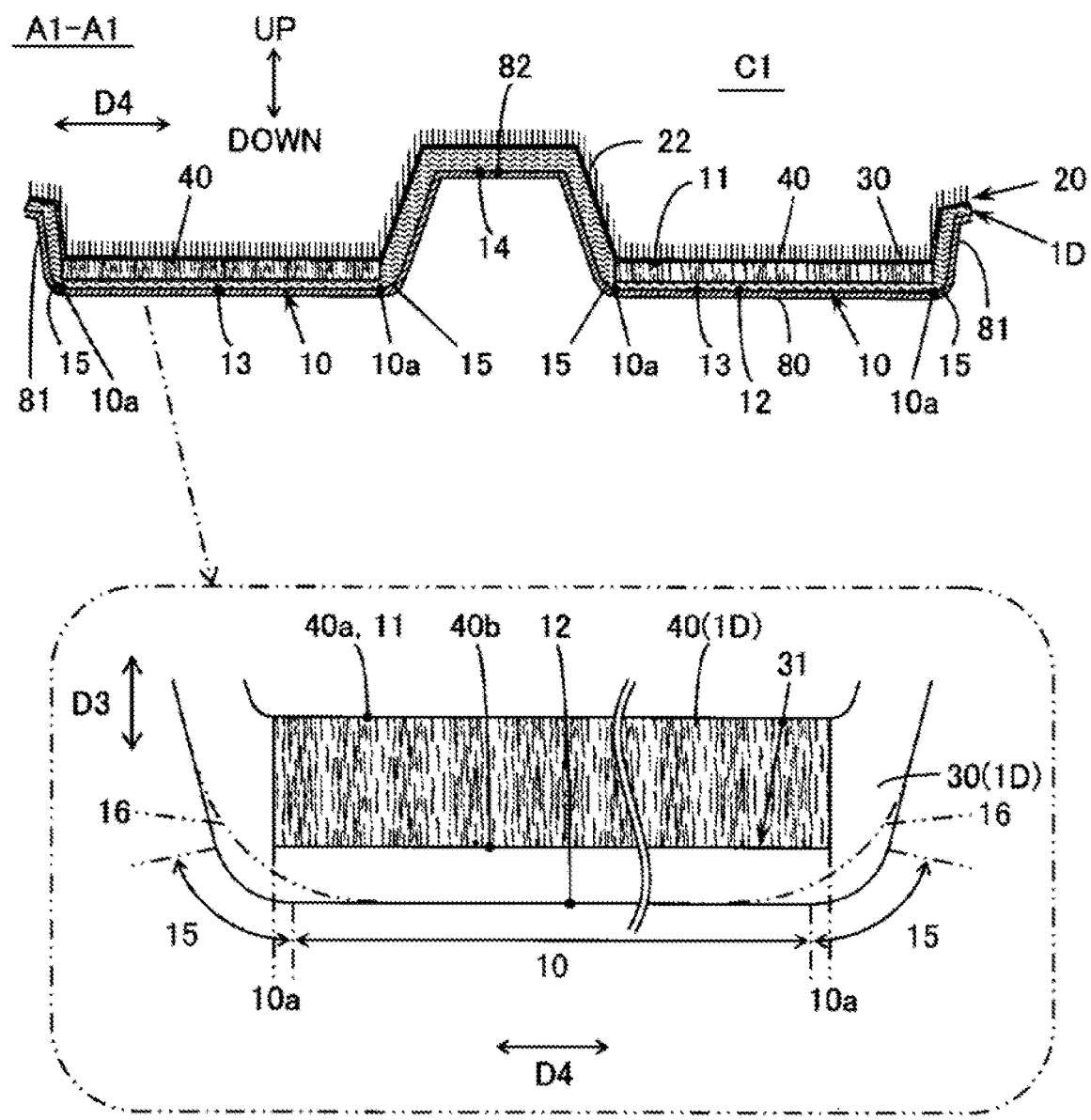
FIG. 13 is a drawing schematically exemplifying a vertical end surface of another silencer together with the vehicle body panel and the skin material cut at the position corresponding to A1-A1 in FIG. 1.

FIG. 13 schematically shows a vertical end surface of a silencer 1D included in the concept of the above described silencer 1 together with the vehicle body panel 80 and the carpet 20 cut at the position corresponding to A1-A1 in FIG. 1. In a lower part of FIG. 13, a main portion of the silencer 1D is schematically shown.

On the second molded surface 12 shown in FIG. 13, a roundly protruded convex portion 15 is formed on the buffer material 40 at a position of an edge portion 10a of the lamination portion 10 in a direction D4 (lateral direction in FIG. 13) different from the thickness direction D3 of the buffer material 40. The direction D4 can be the longitudinal direction or the direction deviated from the lateral direction or the longitudinal direction. The direction D4 can be the lamination direction D1 of the web M1, the width direction D2 of the web M1, or the direction different from both directions D1, D2. As shown in a lower part of FIG. 13, the edge portion 10a of the lamination portion 10 is the projected position of the edge portion (circumferential portion 40c) of the buffer material 40 when the buffer material 40 is projected in the thickness direction D3. When the position of the circumferential portion 40c in the direction D4 is different between the edge portion of the first molded surface 11 side and the edge portion of the second molded surface 12 side, such as when the buffer material 40 is formed in an approximately trapezoidal cross section, the edge portion 10a of the lamination portion is the projected position of the edge portion of one of the molded surfaces 11, 12 on which the convex portion 15 is formed when the buffer material 40 is projected in the thickness direction D3. For example, when the convex portion 15 is formed on the second molded surface 12 and the buffer material 40 is formed in an approximately trapezoidal cross section, the edge portion 10a of the lamination portion is the projected portion of the edge portion of the outer surface 40b of the back side of the buffer material 40 when the buffer material 40 is projected in the thickness direction D3. The phrase "the convex portion 15 is formed at a position of an edge portion 10a of the lamination portion 10" means that the edge portion 10a of the lamination portion 10 is located in a range of the convex portion 15. The range of the convex portion 15 is the range of the outer surface of the silencer protruded outward. For example, the range of the convex portion 15 is the range of the surface having a curvature radius protruding outward of the silencer. The shape of the convex portion 15 is not limited to the roundly protruded shape having a constant curvature radius (referred to as R). The shape of the convex portion includes a protruded shape in which a curvature radius can be changed according to the position, for example. The same can be said about a silencer 1E (shown in FIG. 14) explained later.

In this variation example, same as the silencer 1 shown in FIG. 2, the concave portion 31 recessed toward the vehicle body panel 80 side is formed on the outer surface of the front side (carpet 20 side) of the fiber assembly 30. The buffer material 40 is inserted into the concave portion 31. The outer surface 40b of the buffer material 40 is not included in the second molded surface 12. The outer surface 40a of the buffer material 40 is included in the first molded surface 11.

In the silencer, when the edge portion of the lamination portion 10 is not located at the portion such as a corner portion where the convex portion 15 needs to be formed, repulsion force of the fiber assembly 30 is relatively low and therefore a broad convex portion 16 having large curvature radius R is formed as shown in a lower part of FIG. 13. In order to reduce the curvature radius R without using the buffer material 40, the density of the fiber assembly 30 should be increased to increase the repulsion force of the fiber assembly 30. In this variation example, since the convex portion 15 is formed at a position of the edge portion 10a of the lamination portion 10 of the buffer material 40 having low density and high repulsion force, the fibers of the fiber assembly 30 are extruded to the convex portion 15 when press molding is performed. Thus, the roundly protruded shape of the convex portion 15 becomes sharp. Accordingly, the space between the vehicle body panel and the silencer can be reduced and vibration control performance can be increased.

In order to arrange the edge portion 10a of the lamination portion 10 on the convex portion, the edge portion (circumferential portion 40c) of the buffer material 40 should be displaced to be aligned with a vertical wall portion such as the edge portion 81 of the vehicle body panel 80 and the tunnel portion 82 or the buffer material 40 should be extended in the lateral direction, the longitudinal direction, and so on. In addition, even when the edge portion (circumferential portion 40c) of the buffer material 40 is partly aligned with the vertical wall portion, vibration control performance is increased. The same can be said about a silencer 1E (shown in FIG. 14) explained later.

Figure 14:
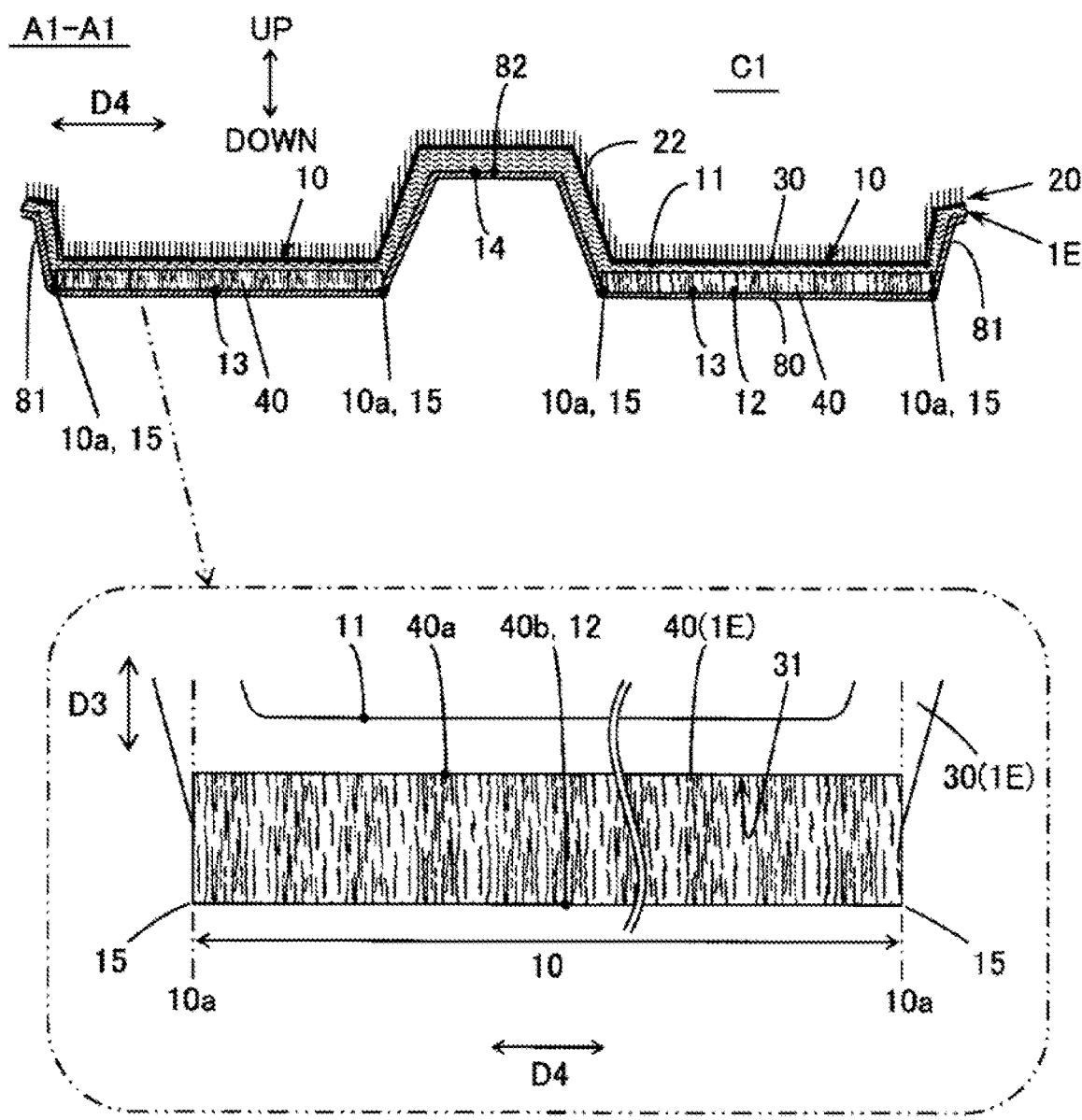
FIG. 14 is a drawing schematically exemplifying a vertical end surface of another silencer together with the vehicle body panel and the skin material cut at the position corresponding to A1-A1 in FIG. 1.

FIG. 14 schematically shows a vertical end surface of the silencer 1E included in the concept of the above described silencer 1 together with the vehicle body panel 80 and the carpet 20 cut at the position corresponding to A1-A1 in FIG. 1. In a lower part of FIG. 14, a main portion of the silencer 1E is schematically shown.

In the second molded surface 12 shown in FIG. 14, the convex portion 15 is formed by the edge portion of the buffer material 40 at a position of the edge portion 10a of the lamination portion 10 in the direction D4 (lateral direction in FIG. 14) different from the thickness direction D3 of the buffer material 40.

In this variation example, same as the silencer 1A shown in FIG. 11, the concave portion 31 recessed toward the carpet 20 side is formed on the outer surface of the back side (vehicle body panel 80 side) of the fiber assembly 30. The buffer material 40 is inserted into the concave portion 31. The outer surface 40a of the buffer material 40 is not included in the first molded surface 11. The outer surface 40b of the buffer material 40 is included in the second molded surface 12.

In this variation example, since the convex portion 15 is formed by the edge portion (circumferential portion 40c) of the buffer material 40 having low density and high repulsion force, the roundly protruded shape of the convex portion 15 becomes sharper than the silencer 1D shown in FIG. 13. Accordingly, the space between the vehicle body panel and the silencer can be further reduced and vibration control performance can be further increased.

The convex portion 15 formed at the position of the edge portion 10a of the lamination portion 10 can be formed on the first molded surface 11. Of course, the convex portion 15 can be formed both on the first molded surface 11 and the second molded surface 12.

As explained above, when the convex portion 15 is formed at the position of the edge portion 10a of the lamination portion 10 on at least one of the molded surfaces 11, 12, the shape of the convex portion 15 such as the corner portion can be sharp. Accordingly, the silencer having the convex portion 15 can reduce the space between the vehicle body panel and the silencer, and increase the vibration control performance.

Figure 15:
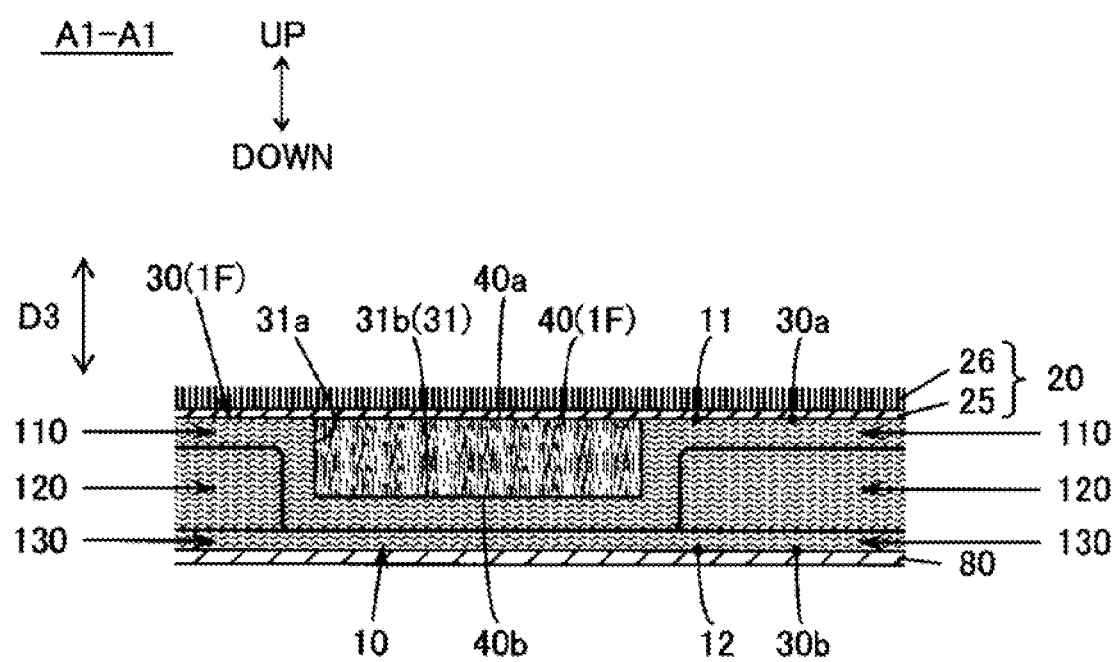
FIG. 15 is a drawing schematically exemplifying a vertical end surface of another silencer together with the vehicle body panel and the skin material cut at the position corresponding to A1-A1 in FIG. 1.

FIG. 15 schematically shows a vertical end surface of the silencer 1F included in the concept of the above described silencer 1 together with the vehicle body panel 80 and the carpet 20 cut at the position corresponding to A1-A1 in FIG. 1. The concave portion 31 is formed on an outer surface 30a of the fiber assembly 30 shown in FIG. 15 so that the buffer material 40 is inserted into the concave portion 31. In the fiber assembly 30, the concave portion 31 is located at the portion where the fibers of the second fiber layer 120 do not exist. Namely, the buffer material 40 is inserted into the fiber assembly 30 so as not to be overlapped with the fibers of the second fiber layer 120 in the thickness direction D3. In other words, the buffer material 40 is overlapped with the portion where the fibers of the second fiber layer 120 do not exist. When the buffer material 40 is inserted into the fiber assembly 30, the fiber assembly 30 of the lamination portion 10 is thinner than the fiber assembly 30 of the portion other than the lamination portion 10. Hence, as shown as the silencer 1F, it is preferred that the buffer material 40 is inserted into the portion where the fibers of the second fiber layer 120 do not exist in the fiber assembly 30.

When the thickness of the lamination portion 10 formed by inserting the buffer material 40 in which the fibers 44 are oriented in the thickness direction D3 into the fiber assembly 30 is relatively thick (e.g., more than 50 mm), performance when stepped on by the foot may be deteriorated. For example, the foot sinks when stepped on the footrest portion 23 (shown in FIG. 1) of the floor carpet 20. In this case, a foamed molded body having a predetermined thickness (e.g. about 10 to 20 mm) can be attached afterward on at least the first molded surface 11 of the lamination portion 10 of the silencer 1 by using hot melt or other method. In this case, the thickness of the lamination portion 10 can be specified so that the thickness is reduced by the thickness of the foamed molded body with respect to the thickness of the silencer 1 at the position corresponding to the footrest portion 23. The material of the foamed molded body is preferably a material formed by foaming resin molding material containing synthetic resin. The synthetic resin is preferably thermoplastic resin such as PP, PE, PS and acrylic-styrene. The foamed molded body is preferably a bead foam-molded body of foamable resin particles. When the formed molded body is attached afterward, the foot sinks less when stepped on the footrest portion 23. Thus, the performance when stepped on by the foot is increased.

When the thickness of the silencer 1 is relatively thick (e.g., more than 50 mm) at the portion into which the buffer material 40 is not inserted, the above described relatively thick formed molded body (e.g., thickness is approximately 30 to 50 mm) can be attached afterward on the first molded surface 11 of this portion by using hot melt or other method. In this case, the thickness of the silencer 1 before attaching the formed molded body can be specified so that the thickness is reduced by the thickness of the foamed molded body with respect to the thickness of the silencer 1 after attaching the formed molded body. When the formed molded body is attached afterward, the foot sinks less when stepped on the footrest portion 23. Thus, the performance when stepped on by the foot is increased.

(5) Conclusion

As explained above, according to various embodiments, the present invention can provide a technology of the silencer for automobile or the like, the silencer being capable of preventing the shape of the fiber molded body having partly different weight per unit area from being collapsed, being cracked, and so on. Of course, the above-described basic operation and effect can be obtained even with the components described in the independent claims and having no features set forth in the dependent claims.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features and the like.

What is claimed is:

1. A silencer for automobile, the silencer being formed by press molding, the silencer having a first molded surface and a second molded surface which are opposite to each other in a thickness direction, the silencer comprising:
    a first fiber layer on which the first molded surface is formed;
    a second fiber layer integrated with an opposite surface to the first molded surface, the opposite surface being on the first fiber layer; and
    a third fiber layer on which the second molded surface is formed, wherein
    fibers of the second fiber layer exist partly on the opposite surface on the first fiber layer,
    the third fiber layer is integrated with the second fiber layer, and
    the third fiber layer is also integrated with the first fiber layer in a part on which the fibers of the second fiber layer do not exist.

2. The silencer for automobile according to claim 1, wherein
    the silencer includes a lamination portion in which a buffer material is inserted into a fiber assembly so as to be partly laminated on the fiber assembly, the fiber assembly at least including the first fiber layer, the second fiber layer and the third fiber layer, and
    a convex portion is formed on at least one of the first molded surface and the second molded surface so that the convex portion is located at a position of an edge portion of the lamination portion in a direction different from the thickness direction.

3. A method of manufacturing a silencer for automobile, the method comprising:
    a first fiber supply step of supplying fibers on a conveyer from a first fiber supply unit to form a first supply fiber layer;
    a second fiber supply step of partly supplying fibers on the first supply fiber layer from a second fiber supply unit to form a second supply fiber layer; and
    a third fiber supply step of supplying fibers on the second supply fiber layer and the first supply fiber layer in a part on which the fibers of the second supply fiber layer do not exist from the third fiber supply unit to form a third supply fiber layer; and a molding step of press-molding a fiber aggregate transferred by the conveyer, the fiber aggregate at least including the first supply fiber layer, the second supply fiber layer and the third supply fiber layer, the second supply fiber layer being to be integrated with the first supply fiber layer, the third supply fiber layer being to be integrated with the second supply fiber layer, the third supply fiber layer being to be also integrated with the first supply fiber layer in a part on which the fibers of the second supply fiber layer do not exist.

4. The method of manufacturing the silencer for automobile, according to claim 3, wherein the second fiber supply unit includes a plurality of divided fiber supply units which supply the fibers to supply positions, each of the supply positions is different in a width direction of the conveyer, and in the second fiber supply step, a weight per unit area of the fibers supplied from the divided fiber supply units to the first supply fiber layer is controlled variably and individually by the divided fiber supply unit.

* * * * *